United States Patent
Yerfule et al.

(10) Patent No.: US 10,387,051 B2
(45) Date of Patent: Aug. 20, 2019

(54) ACQUISITION OF IOPS AND MBPS LIMITS INDEPENDENTLY AT A SCHEDULER IN A SCHEDULER HIERARCHY

(71) Applicant: Hewlett Packard Enterprise Development LP, Houston, TX (US)

(72) Inventors: Sourabh Yerfule, San Jose, CA (US); Gurunatha Karaje, San Jose, CA (US); Mandar Samant, San Jose, CA (US); Sagar Trehan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 59 days.

(21) Appl. No.: 15/686,072

(22) Filed: Aug. 24, 2017

(65) Prior Publication Data

US 2019/0065078 A1 Feb. 28, 2019

(51) Int. Cl.
*G06F 3/06* (2006.01)
*G06F 9/50* (2006.01)
*G06F 9/48* (2006.01)

(52) U.S. Cl.
CPC .......... *G06F 3/0617* (2013.01); *G06F 3/0665* (2013.01); *G06F 3/0685* (2013.01); *G06F 9/4881* (2013.01); *G06F 9/50* (2013.01); *G06F 3/067* (2013.01)

(58) Field of Classification Search
CPC .... G06F 3/0617; G06F 3/0665; G06F 3/0685; G06F 9/50; G06F 9/4881; G06F 3/067
See application file for complete search history.

(56) References Cited

U.S. PATENT DOCUMENTS

| | | |
|---|---|---|
| 6,675,190 B1 | 1/2004 | Schabernack et al. |
| 6,938,256 B2 | 8/2005 | Deng et al. |
| 7,334,162 B1 | 2/2008 | Vakrat et al. |
| 7,783,852 B2 | 8/2010 | Lahiri et al. |
| 7,941,527 B1 | 5/2011 | Jacoby et al. |
| 8,041,808 B1 | 10/2011 | Becker |
| 8,458,509 B1 | 6/2013 | Sreegiriraju et al. |
| 8,848,723 B2 | 9/2014 | Sundararaman et al. |
| 9,160,684 B2 | 10/2015 | Sundararaman et al. |
| 9,367,366 B2 | 6/2016 | Xiong et al. |

(Continued)

OTHER PUBLICATIONS

Pure Storage, Inc., "The Purity Operating Environment: Storage software born for flash," Jul. 26, 2013, <https://web.archive.org/web/20130726212513/http://www.purestorage.com/flash-array/purity.html>.

*Primary Examiner* — Benjamin C Wu

(57) ABSTRACT

Examples include acquisition of IOPS limits and MBPS limits independently at a parent scheduler in a scheduler hierarchy of a storage system, wherein the scheduler hierarchy includes a parent level and a child level below the parent level. Examples include setting IOPS limits and MBPS limits independently at each child scheduler placed within the child level of the scheduler hierarchy. Examples include receiving a CPU resource allocation at the parent scheduler, wherein the CPU resource allocation is convertible to an IOPS allocation at the parent scheduler. Example include distributing the IOPS allocation among the child schedulers below the parent scheduler such that each of the child schedulers receive the same distribution of the IOPS allocation. Example include allocating IOPS between the child schedulers based on their corresponding IOPS limits.

20 Claims, 16 Drawing Sheets

(56) References Cited

U.S. PATENT DOCUMENTS

| | | |
|---|---|---|
| 9,558,250 B2 | 1/2017 | Sun et al. |
| 9,871,855 B2 | 1/2018 | Likhtarov et al. |
| 2004/0181594 A1* | 9/2004 | Suleiman ............ H04L 67/1097 709/225 |
| 2006/0280119 A1 | 12/2006 | Karamanolis et al. |
| 2007/0064711 A1 | 3/2007 | Wang et al. |
| 2007/0226332 A1* | 9/2007 | Becker-Szendy ....... G06F 16/10 709/224 |
| 2008/0222311 A1* | 9/2008 | Lee ..................... G06F 3/061 710/6 |
| 2009/0164274 A1 | 6/2009 | Narayanaswamy et al. |
| 2010/0083262 A1* | 4/2010 | Gulati ................. G06F 9/5011 718/102 |
| 2010/0162253 A1 | 6/2010 | Jeong |
| 2011/0265083 A1 | 10/2011 | Davis |
| 2011/0314182 A1* | 12/2011 | Muppirala ............. G06F 13/00 710/5 |
| 2012/0020368 A1 | 1/2012 | Sundararaman et al. |
| 2012/0023498 A1 | 1/2012 | Sundararaman et al. |
| 2012/0060168 A1 | 3/2012 | Lee et al. |
| 2012/0063313 A1 | 3/2012 | Zhou et al. |
| 2013/0326064 A1* | 12/2013 | Gulati ................... G06F 9/5061 709/226 |
| 2014/0130055 A1* | 5/2014 | Guha .................... G06F 3/0604 718/104 |
| 2014/0281121 A1 | 9/2014 | Karamcheti et al. |
| 2015/0373049 A1 | 12/2015 | Sharma et al. |
| 2016/0021172 A1 | 1/2016 | Mahadevan |
| 2016/0044126 A1 | 2/2016 | Mahadevan et al. |
| 2016/0077571 A1 | 3/2016 | Sagar et al. |
| 2016/0092108 A1 | 3/2016 | Karaje et al. |
| 2016/0092272 A1 | 3/2016 | Karaje et al. |
| 2016/0275422 A1 | 9/2016 | Chape et al. |
| 2016/0291885 A1* | 10/2016 | Pendharkar ......... G06F 13/4027 |
| 2017/0010919 A1 | 1/2017 | Yerfule et al. |
| 2017/0132040 A1* | 5/2017 | Yerfule ............... H04L 67/1097 |
| 2017/0177221 A1* | 6/2017 | Trehan .................. G06F 3/061 |
| 2017/0177222 A1* | 6/2017 | Singh ..................... G06F 3/061 |
| 2017/0286516 A1 | 10/2017 | Horowitz et al. |
| 2017/0293426 A1* | 10/2017 | Karaje ................... G06F 3/061 |
| 2018/0081832 A1 | 3/2018 | Longo et al. |
| 2018/0267728 A1* | 9/2018 | Booth .................... G06F 11/30 |

* cited by examiner

US 10,387,051 B2

ACQUISITION OF IOPS AND MBPS LIMITS INDEPENDENTLY AT A SCHEDULER IN A SCHEDULER HIERARCHY

TECHNICAL FIELD

The present embodiments relate to methods, systems, and programs for scheduling operations in a scheduler hierarchy of a data storage system, and more particularly, implementing and applying IOPS (inputs/outputs per second) and MBPS (megabytes per second) limits independently at each level of a scheduler hierarchy of a data storage system (e.g., LUN, volume, etc.).

BACKGROUND

Network storage, also referred to as network storage systems or data storage systems, is computer data storage connected to a computer network providing data access to heterogeneous clients. Network storage systems may process a large amount of Input/Output (IO) requests, and high availability, speed, and reliability are desirable characteristics of network storage. In addition to processing read and write IO requests, network storage systems may perform other background operations for maintaining these systems, such as garbage collection of obsolete data and compaction of data (e.g., merging contents of two half-filled segments into one full segment), creating snapshots of data, backup, and replication procedures, etc.

Volumes in a data storage system are subjected to disparate load pattern. Some of these volumes receive bursty IOs, while other may receive consistent IOs. A sudden burst on a bursty volume can impact other volumes. These volumes can be tagged as noisy neighbors. Apart from bursty volumes, volumes receiving steady IOs with large queue depth can also act as noisy neighbors. For example, a single volume may use up most or all of the resources of a central processing unit (CPU). In one illustration, a particular virtual machine (VM) may hog up the resources of the CPU by processing IOs for a particular volume. In that case, other VMs are prevented from executing their operations.

BRIEF DESCRIPTION OF THE DRAWINGS

Embodiments described herein may best be understood by reference to the following description taken in conjunction with the accompanying drawings.

DETAILED DESCRIPTION

Figure 1:
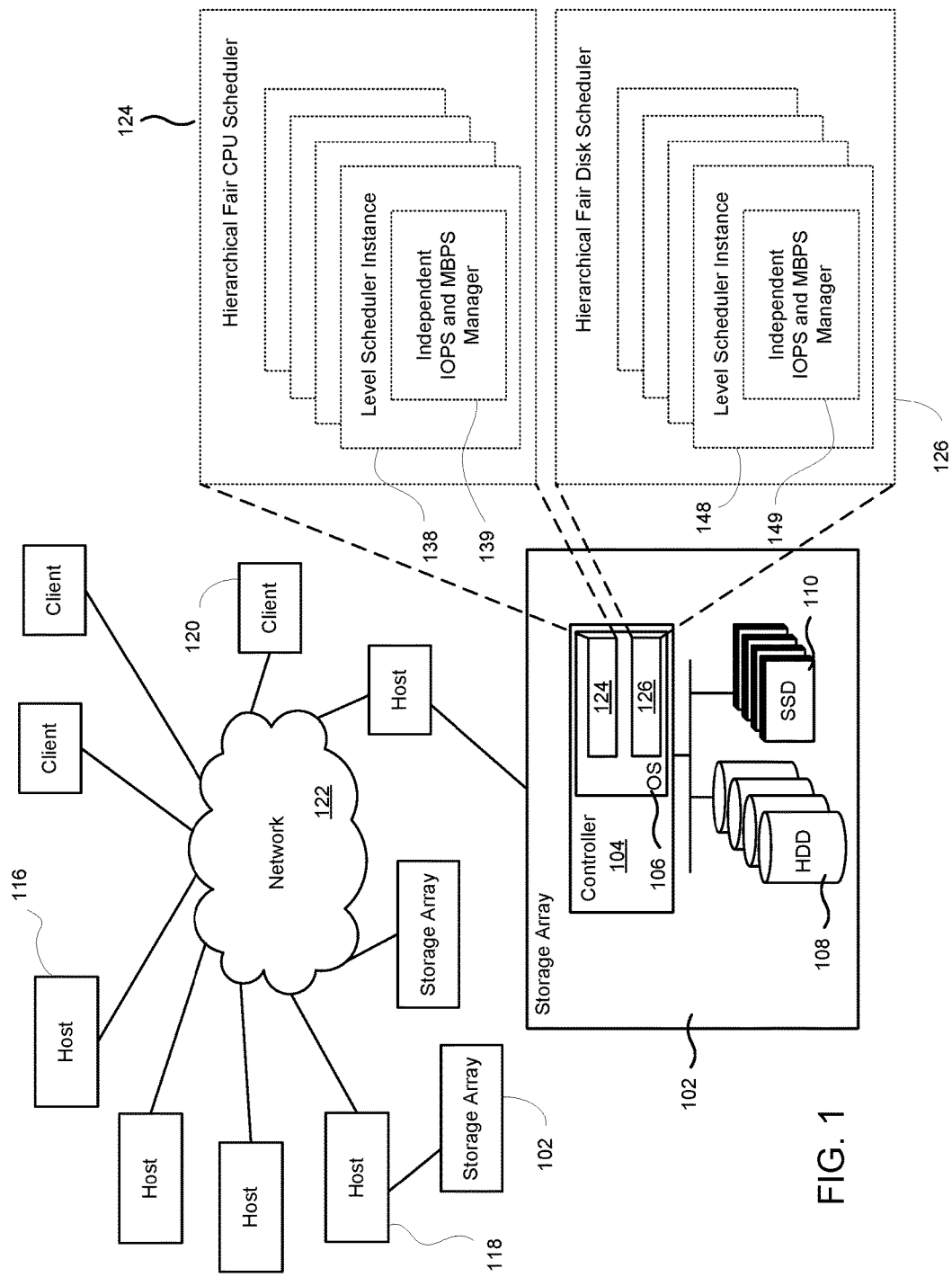
FIG. 1 depicts a system with network storage, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for the fair utilization of system resources of a data storage system. In particular, methods and systems are presented for independently setting IOPS (inputs/outputs per second) and MBPS (megabytes per second) limits at each level of a scheduler hierarchy. Specifically, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.). In this manner, by independently setting IOPS and throughput (e.g., MBPS) limits on rogue volumes, the adverse effect of noisy neighbors of volumes can be avoided. In particular, independent IOPS and MBPS limits restrict the maximum possible IOPS or throughput that can be admitted for a volume, which avoids any interference with other production volumes.

Examples described herein may include network storage device(s), software, and system(s) that provide for the reduction of and/or isolation of the effects of noisy neighbors (e.g., rogue volumes dominating the use of CPU resources) of a storage system.

Embodiments described herein may relate to fair utilization of system resources of a data storage system. In particular, methods and systems are presented for independently setting IOPS (inputs/outputs per second) and MBPS (megabytes per second) limits at each level of a scheduler hierarchy. Specifically, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.). It should be appreciated that the present embodiments can be implemented in numerous ways, such as a method, an apparatus, a system, a device, or a computer program on a computer readable medium. Several embodiments are described below.

In one embodiment, a method for scheduling operations in a storage system including a scheduler hierarchy is disclosed and includes acquiring IOPS limits and MBPS limits independently at a parent scheduler in a scheduler hierarchy of the storage system, wherein the scheduler hierarchy includes a parent level and a child level below the parent level. The IOPS and MBPS limits may be set independent of each other. The method further includes acquiring IOPS limits and MBPS limits independently at each child scheduler placed within the child level of the scheduler hierarchy. The IOPS and MBPS limits may be set independent of each other. The method further includes receiving a central processing unit (CPU) allocation at the parent scheduler, wherein the CPU resource allocation is convertible to an IOPS allocation at the parent scheduler. The method further includes distributing the IOPS allocation among the child schedulers below the parent scheduler such that each of the child schedulers receive the same distribution of the IOPS allocation. The method further includes allocating IOPS between the child schedulers based on their corresponding IOPS limits. If after application of IOPS limits of child schedulers results in any residue, that residue is fairly distributed or allocated between the schedulers at the parent level to implement the work conserving principle In still another embodiment, a data storage system includes first and second memory controllers, each of which comprises a central processing unit (CPU) including a plurality of core processors and a non-volatile memory (NVRAM) for storing incoming write requests. The data storage system includes a solid state drives/memory (SSD) configured as a read cache memory, and a hard drive (HDD) configured for permanent data storage as memory. More particularly, the memory is coupled to the processor (e.g., CPU) and having stored therein machine-readable instructions that, when executed by the CPU of the computer system, cause the computer system to execute a method for scheduling operations in the storage system. The method includes acquiring IOPS limits and MBPS limits independently at a parent scheduler in a scheduler hierarchy of the storage system, wherein the scheduler hierarchy includes a parent level and a child level below the parent level. The IOPS and MBPS limits may be set independent of each other. The method further includes acquiring IOPS limits and MBPS limits independently at each child scheduler placed within the child level of the scheduler hierarchy. The IOPS and MBPS limits may be set independent of each other. The method further includes receiving a central processing unit (CPU) allocation at the parent scheduler, wherein the CPU resource allocation is convertible to an IOPS allocation at the parent scheduler. The method further includes distributing the IOPS allocation among the child schedulers below the parent scheduler such that each of the child schedulers receive the same distribution of the IOPS allocation. Based on the IOPS/MBPS limits of the parent scheduler, CPU resources will be allocated to the parent scheduler. The parent scheduler then distributes CPU resources equally among all the child schedulers. Each of the child schedulers determines how to use its fair allocation of CPU resources. For example, if all the child schedulers are running the same IO size operations, then IOPS will be equally divided among all the child schedulers. In that case, if any of the child schedulers has an IOPS limit that is set lower than its allocated fair share, then the residue (e.g., remainder) will be distributed between all the other child schedulers (e.g., the siblings). The method further includes allocating IOPS between the child schedulers based on their corresponding IOPS limits.

In still another embodiment, a non-transitory computer-readable medium including machine-readable instructions executable by at least one processor for scheduling operations in a storage system is disclosed. The computer-readable medium includes program instructions for acquiring IOPS limits and MBPS limits independently at a parent scheduler in a scheduler hierarchy of the storage system, wherein the scheduler hierarchy includes a parent level and a child level below the parent level. The IOPS and MBPS limits may be set independent of each other. The computer-readable medium further includes program instructions for acquiring IOPS limits and MBPS limits independently at each child scheduler placed within the child level of the scheduler hierarchy. The IOPS and MBPS limits may be set independent of each other. The computer-readable medium further includes program instructions for receiving a central processing unit (CPU) allocation at the parent scheduler, wherein the CPU resource allocation is convertible to an IOPS allocation at the parent scheduler. The computer-readable medium further includes program instructions for distributing the IOPS allocation among the child schedulers below the parent scheduler such that each of the child schedulers receive the same distribution of the IOPS allocation. The computer-readable medium further includes program instructions for allocating IOPS between the child schedulers based on their corresponding IOPS limits.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

FIG. 1 depicts a system with network storage, according to one embodiment. The networked storage device, also referred to herein as a storage array 102 or a data storage system, includes a controller 104 with a storage operating system 106, which is a multitasking system able to execute several tasks concurrently. One or more tasks are configured to process IO requests, and these tasks that process IOs are referred to herein as foreground tasks. Background tasks are tasks that do not cause a host initiator to wait for their output. For example, background tasks may include system maintenance tasks (e.g., processing an alert when resource consumption reaches a threshold, taking a scheduled snapshot, garbage collection (GC), etc.). More particularly, the operating system 106 is configured to perform cross-charging of costs when scheduling IOs accessing a portion of a data storage system (e.g., LUN, volume, etc.) in a scheduler hierarchy as implemented across a plurality of cores.

In the example architecture of FIG. 1, one or more storage arrays 102 provide storage services to one or more servers 116, 118 (which are referred to herein as hosts) and to one or more clients 120. The configuration will depend on the implementation of the storage array and the demand by application. Network 122 provides transport for the data exchanges between the storage array 102 and servers 116, 118 or clients 120. In addition, server 118 may be directly connected to a storage array without communicating through network 122. Storage array 102 includes one or more memory controllers 104, one or more hard disk drives (HDD) 108, and one or more solid state drives (SSD) 110, also referred to herein as flash cache. Additional examples regarding the system are provided below.

In one embodiment, the storage operating system 106 executing in the controller 104 includes a hierarchical fair CPU scheduler 124 and/or a hierarchical fair disk scheduler 126. For example, the hierarchical fair CPU scheduler 124 is configured for allocating resources (e.g., CPU cycles) when scheduling IOs. Scheduler instances 138 (e.g., array, folder, volume, etc.) at each level of a scheduler hierarchy are configured for providing the fair utilization of system resources of a data storage system through independently setting IOPS and MBPS limits at each level of the scheduler hierarchy and the application/management of such limits through the IOPS and MBPS manager 139 when allocating system resources through the scheduler hierarchy. Similar, the hierarchical fair disk scheduler 126 is configured for implementing and managing IOPS and MBPS limits independently at each level of a scheduler hierarchy when controlling disk access. In particular, level scheduler instances 148 (e.g., array, folder, volume, etc.) in the scheduler hierarchy are each configured for providing the fair utilization of system resources of a data storage system through independently setting IOPS and MBPS limits at each level of a scheduler hierarchy and the application/management of such limits through the IOPS and MBPS manager 149 when allocating system resources through the scheduler hierarchy While embodiments are described with the reference to the hierarchical fair CPU scheduler 124 to illustrate the implementation and management of IOPS and MBPS limits independently at each level of a scheduler hierarchy to access a particular portion of the data storage system 102, the same principles may be applied to the hierarchical fair disk scheduler 126.

Figure 2:
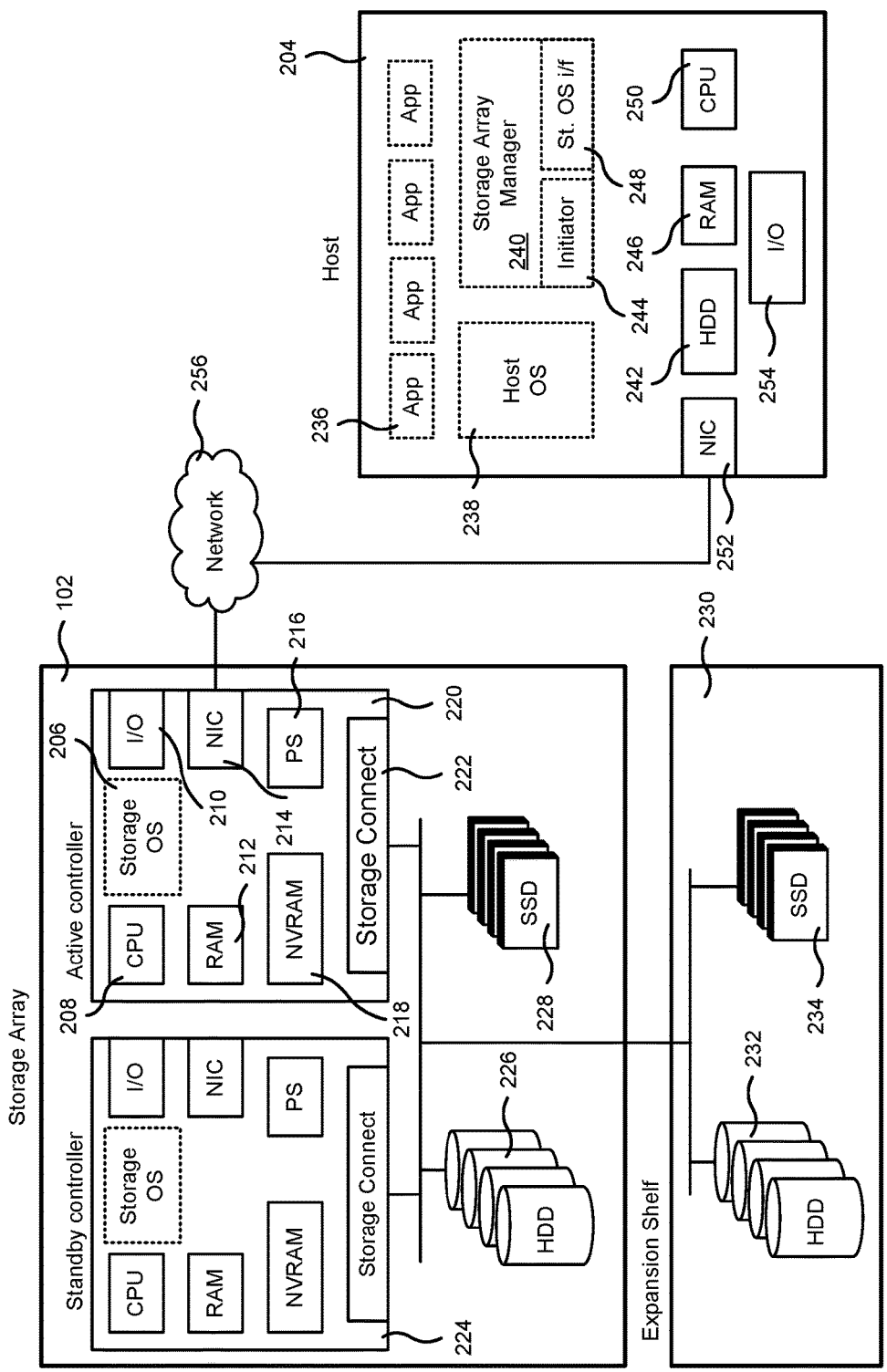
FIG. 2 illustrates the architecture of a storage array, in accordance with one embodiment of the present disclosure.

FIG. 2 illustrates an example architecture of a storage array 102, according to one embodiment. In one embodiment, storage array 102 includes an active controller 220, a standby controller 224, one or more HDDs 226, and one or more SSDs 228. It is important to note that either controller can operate in the active mode, and either controller can operate in the standby mode, such that when both controllers are on-line one controller is designated as the active controller and functions to service IOs from one or more hosts, while the other controller remains in standby mode ready to step in and handle the IOs when a failure (real or instantiated) to the active controller occurs. As such, the active controller 220 and the standby controller 224 are configured similarly and mirrored appropriately, such that either controller when designated active can access (e.g., write, read, etc.) data stored in any of the storage mediums of the storage array 102, including a corresponding NVRAM, read cache SSD 228, and HDD 226 to serve IOs from hosts. In one embodiment, the active controller 220 includes NVRAM 218, which in one implementation is used for immediately storing the incoming data (e.g., write data) as it arrives to the storage array. In that manner, storage array 102 provides immediate acknowledgment of a write request to the requesting host. After the data is processed (e.g., compressed and organized in segments (e.g., coalesced)), the data is transferred from the NVRAM 218 to HDD 226, or to read cache SSD 228 if the data is determined to be cache worthy, or to both.

The active controller 220 includes various components that enable efficient processing of read and write requests. For instance, data from a write operation is stored first in the NVRAM 218 of active controller 220, and provides for immediate acknowledgment of acceptance and storage of the data back to the host, thereby providing increased storage system performance. Because the data is later stored in HDD 226 and/or SSD 228, a later read access will retrieve the data from the location giving the quickest access. For example, the data is retrieved from NVRAM 218 for the quickest response time if the data is still available. Further description of the operations performed during write and read requests is provided in relation to FIGS. 3 and 4.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, active controller 220 is configured to implement and apply IOPS and MBPS limits independently at each level of a scheduler hierarchy when allocating system resources through the hierarchy for purposes of scheduling IOs accessing a portion of a data storage system (e.g., array, folder, LUN, volume, etc.) as implemented across a plurality of cores of a CPU. In one embodiment, standby controller 224 includes the same components as active controller 220.

In one embodiment, bus 290 provides connectivity between the components of the active controller 220 and the components of the standby controller 224, for example to implement an active/standby array configuration, wherein the active controller 220 services IO requests from one or more hosts and the standby controller 224 services write cache mirroring requests (e.g., mirrors writes to NVRAM 218 to NVRAM 299) while remaining ready to assume the primary responsibility of servicing IOs when a failure occurs at the active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

In one embodiment, active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM 299. If the active controller 220 fails, standby controller 224 takes over the management of the storage array 102. For example, one or both of the failover managers 134 in the controllers 220 and 224 implement and/or manage the failover process. When servers, also referred to herein as hosts, connect to the storage array 102, read/write requests (e.g., IO requests) are sent over network 256, and the storage array 102 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an IO operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein.

To process IO requests, resources from the storage array 102 are utilized. Some of these resources may be a bottleneck in the processing of storage requests because the resources are over utilized, or are slow, or for any other reason. In general, the CPU and the hard drives of the storage array 102 can become over-utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests, the SSD cache, which is a fast responding system may press the CPU for cycles, thus causing potential bottlenecks for other requested IOs or for processing background operations. The hard disks may also become a bottleneck because the inherent access speed to data is slow when compared to accessing data from emery (e.g., NVRAM) or SSD 228. Embodiments described herein are able to reduce bottlenecks at the CPU and/or HDD, by ensuring that the CPU or disk access resources assigned to various tasks are controlled by implementing and applying IOPS and MBPS limits independently at each level of a scheduler hierarchy when allocating system resources through the hierarchy for purposes of scheduling IOs accessing a portion of a data storage system (e.g., array, folder, LUN, volume, etc.) as implemented across a plurality of cores of a CPU. This provides for efficient use of resources, thereby reducing the overall cost and use of those resources when met with a given demand.

More details are provided below regarding example elements in FIGS. 1 and 2 with reference to FIGS. 3-8. It should be understood, however, that specific implementations may utilize different modules, different protocols, different number of controllers, etc., while still being configured to execute or process operations taught and disclosed herein.

As such, the example structure of FIG. 2 should not be interpreted to be exclusive or limiting, but rather exemplary or illustrative.

Figure 3:
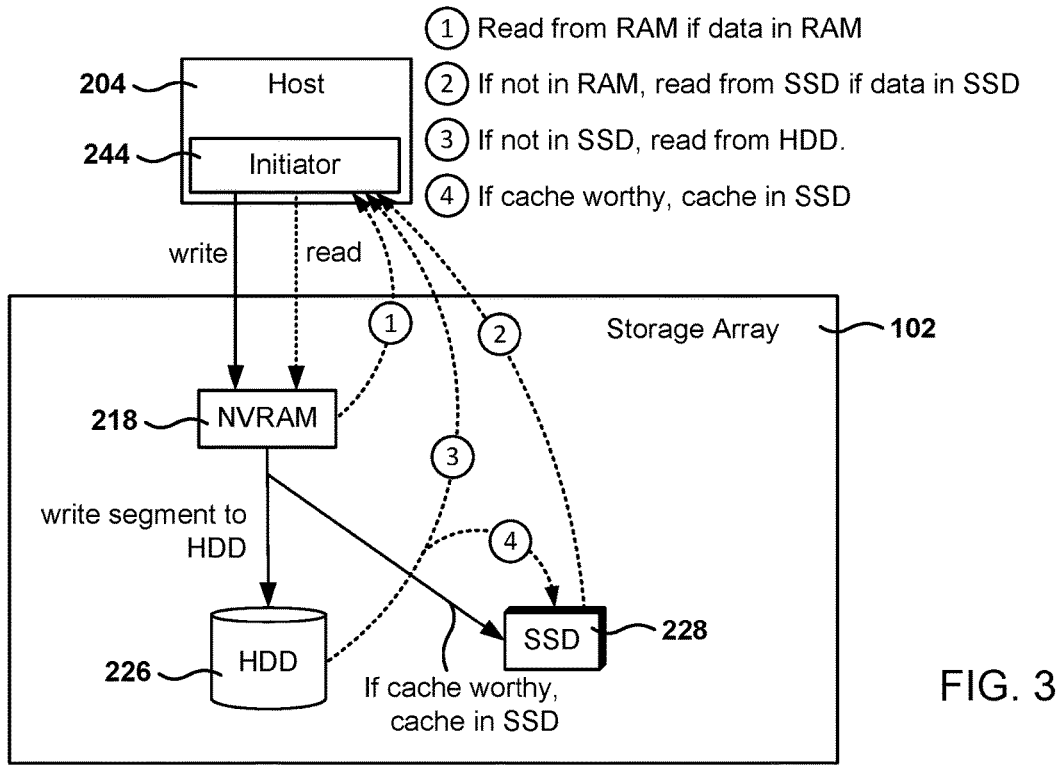
FIG. 3 illustrates read and write paths within the storage array, in accordance with one embodiment of the present disclosure.

FIG. 3 illustrates read and write paths within the storage array 102, according to one embodiment. Regarding the write path, the initiator 244 in the host 204 sends the write request to the storage array 102. As the write data comes in, the write data is written into NVRAM 218, and an acknowledgment is sent back to the initiator (e.g., the host or application making the request). In one embodiment, storage array 102 supports variable block sizes. Data blocks in the NVRAM 218 are grouped together to form a segment that includes a plurality of data blocks, which may be of different sizes. The segment is compressed and then written to HDD 226. More details are provided below regarding the transfer of data from the NVRAM 218 to HDD 226 with reference to FIG. 4. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 102. The requested data may be found in any of the different levels of storage mediums of the storage array 102. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 4:
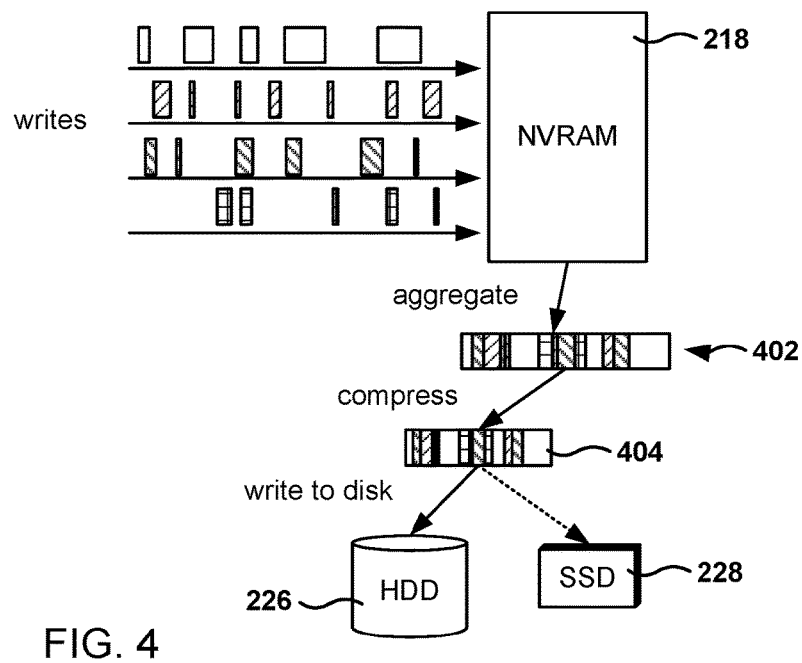
FIG. 4 illustrates the segmentation and compression of write data blocks before saving in hard disk, in accordance with one embodiment of the present disclosure.

FIG. 4 illustrates the segmentation and compression of write data blocks before saving/writing to hard disk, in accordance with one embodiment. The different blocks arrive from one or more hosts to the storage array and then the blocks are stored in NVRAM 218. The incoming blocks are then aggregated into a segment 402, by concatenating the receiving blocks as they arrive to the NVRAM. It is noted that the blocks may have different sizes in one embodiment. The segment 402 is compressed 404 before transmittal to the disk, which results in time savings for the transmittal and savings in the space utilized in the hard drives 226. As noted above, if the data is cache-worthy then the data is also written to flash cache 228. This architecture is very efficient for random writes, as the data is not sorted before being sent to the hard drives, as it is often done in other storage architectures. Here, the data is fluently captured, segmented, compressed, and then sent to the drives, which results in a fast write path for the incoming data.

Figure 5A:
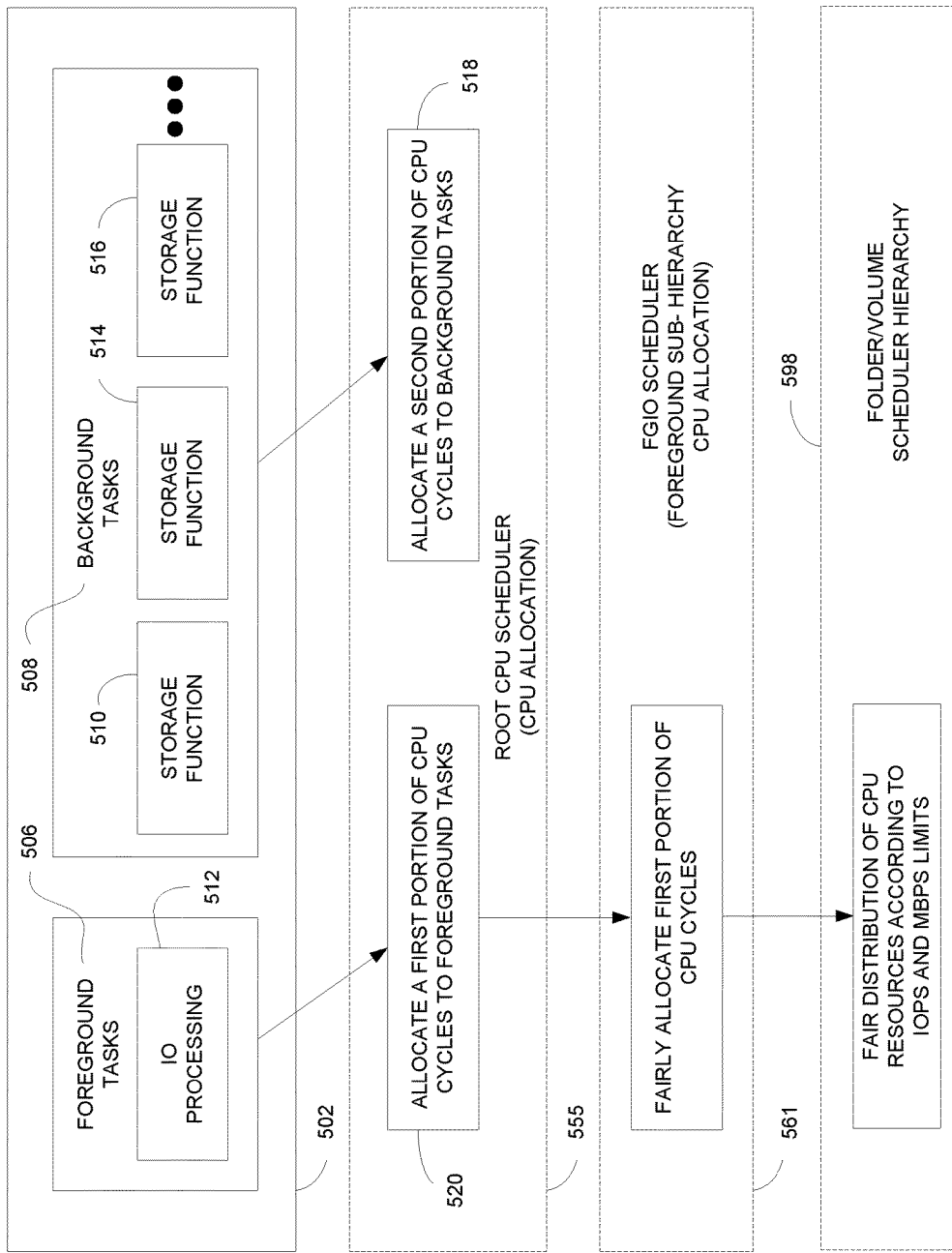
FIG. 5A illustrates the distribution of resources and the fair allocation of CPU resources as implemented in a high level diagram of a scheduler hierarchy in a data storage system, in accordance with one embodiment of the present disclosure.

FIG. 5A illustrates resource distribution, fair distribution of system resources, and rate limiting based on the implementation and application of IOPS and MBPS limits independently at each level of a scheduler hierarchy when allocating system resources through the hierarchy for purposes of scheduling IOs accessing a portion of a data storage system (e.g., array, folder, LUN, volume, etc.) as implemented in a high level diagram of the scheduler hierarchy in a data storage system, in accordance with one embodiment of the present disclosure. As shown, a plurality of tasks 502 performed in a data storage system includes foreground tasks 506 and background tasks 508. Foreground tasks 506 refer to the processing of IO requests 512 by one or more processors, as previously described. For example, the storage array may have a CPU with multiple core processors (e.g., 2, 4, 8, 12, 16, 20, 24, 44 cores, etc.). In one embodiment, threads are created within each CPU core for processing requests, and may be referred to as worker threads. In one implementation, one thread may be created per CPU core. In other implementations, multiple threads per CPU core may be supported. Threads are constantly running as long as requests need to be processed.

Background tasks 508 (e.g., storage function 510, storage function 514, and storage function 516, etc.) are tasks created in the storage system for general operations in the array. The background tasks may arise in response to certain events, such as consumption of a resource reaching a threshold, periodicity to ensure metadata consistency, a schedule to take a snapshot becoming ready, etc. For example, background tasks may include garbage collection of obsolete data, compaction of data (e.g., merging contents of two half-filled segments into one full segment), creating snapshots of data, backup, and replication procedures, etc.

In one embodiment, a root fair CPU scheduler 555 is configured to fairly allocate CPU cycles to foreground workloads 506 and background tasks 508. In particular, to ensure fairness between background tasks and foreground workloads, root fair CPU scheduler 555 identifies tasks waiting to be executed and allocates resources to these tasks fairly. For example, root fair CPU scheduler 555 performs operations to allocate a first portion of CPU cycles to foreground tasks at block 520, and performs operations to allocate a second portion of CPU cycles to background tasks at block 518. In that manner, static distribution of resources is achieved between foreground tasks and background tasks. In addition, fairness in resource allocation means that any single background task or foreground IO processing cannot dominate CPU utilization. As such, any single foreground workload cannot dominate with regards to receiving input/output per second (IOPS) or MBPS from the data storage system. For instance, a single scheduler (e.g., array, folder, LUN, volume, etc.) cannot dominate the allocation of resources over the needs of other schedulers. In one embodiment, fairness enables proper assignment of resources in terms of allocating CPU cycles. In another embodiment, fairness enables proper assignment of resources in terms of data consumption or throughput, where the data consumption may be measured as megabytes accessed or megabytes per second (MBPS) as delivered by the different workloads.

In addition, a foreground input/output (FGIO) scheduler 561 is configured to fairly allocate the first portion of CPU cycles that are assigned to foreground workloads (e.g., tasks) throughout a scheduler hierarchy of a data storage system, wherein the hierarchy includes the FGIO scheduler and its descendent schedulers as arranged in a sub-scheduler hierarchy 598 including folder and volumes, wherein a folder includes one or more of folders and/or volumes. Further, each of the individual schedulers is configured to schedule tasks including IOs, wherein each scheduler (e.g., on a corresponding core processor) accesses a particular portion of the storage array 102 (e.g., array, folder, LUN, volume, etc.). Multiple flows configured for accessing a particular portion (e.g., LUN, volume, etc.) are each associated with its own schedulers (e.g., read flow scheduler, write flow scheduler, etc.). Fair utilization of system resources is achieved through independently setting IOPS and MBPS limits at each level of the scheduler hierarchy and the application/management of such limits when allocating system resources, as will be further described below. Moreover, flow schedulers across all the flows configured for accessing a particular portion (e.g., LUN, volume, etc.) account for all IOs scheduled by all of them at a single, common place so that each instance of any flow scheduler has a view of costs incurred by other instances of any flow scheduler. This is achieved by cross-charging costs across all the flow schedulers of all the flows (e.g., scheduler instances across multiple CPUs) using a shared currency.

Figure 5B:
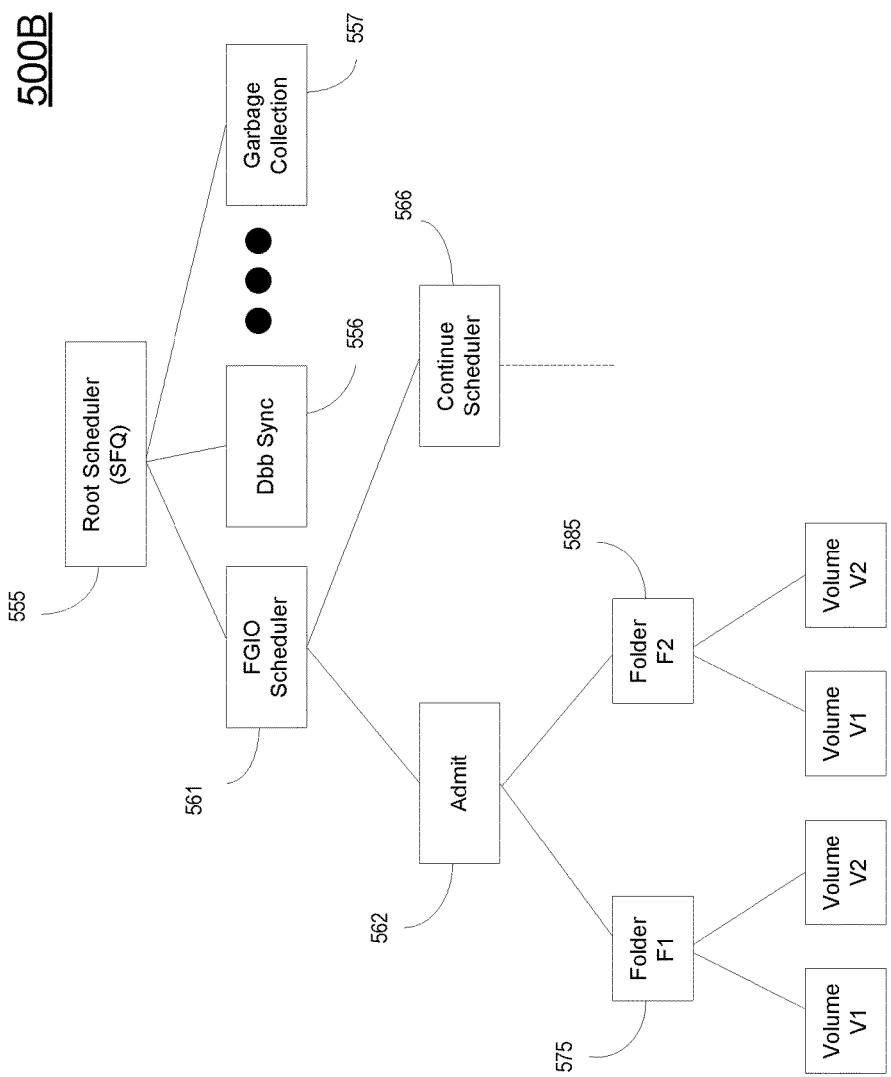
FIG. 5B is a block diagram of a scheduler hierarchy in a data storage system (e.g., including LUNs, volumes, etc.) including an illustration of a parent folder and child volumes, wherein the schedulers in the hierarchy are configured for fair allocation of CPU resources, and wherein IOPS and MBPS limits may be independently set at each of the schedulers, in accordance with one embodiment of the present disclosure.

FIG. 5B is a block diagram of a universal scheduler hierarchy 500B in a data storage system (e.g., including arrays, folders, LUNs, volumes, etc.) including an illustration of multiple parent folders and child volumes, wherein the schedulers in the hierarchy are configured for fair allocation of CPU resources, and wherein IOPS and MBPS limits may be independently set at each of the schedulers, in accordance with one embodiment of the present disclosure. The universal scheduler hierarchy 500B in a data storage system is configured to perform fair utilization of system resources through independently setting of IOPS and MBPS limits at each level of the hierarchy and the application/management of the limits when scheduling IOs to a particular portion of a data storage system 102. For clarity and illustration, the particular portion of the data storage system 102 is referenced as a virtual LUN throughout the application, though it may be a volume, or any other virtual partition (e.g., folder, array, etc.). The universal scheduler hierarchy 500B includes a root CPU scheduler 555, and a foreground (FGIO) flow scheduler 561. Other schedulers may be included, such as a Dbb Sync scheduler 556, garbage collector scheduler 557, etc. Schedulers in the hierarchy 500B know about the relative importance of tasks to be performed, including configured user parameters regarding priority/importance for allocation. A CPU scheduling system includes the hierarchy of schedulers 500B, wherein schedulers in the system operate cooperatively at different levels. For example, the CPU scheduling system determines the order in which tasks are processed (i.e., assigned CPU time) and how much CPU resources (e.g., CPU cycles) are allocated to the tasks.

In one embodiment, each scheduler in the hierarchy 500B operates on one or more schedulable entities, wherein entities handle any IO request (e.g., for performing IOs) or any work request (e.g., for performing background tasks). Maintaining multiple levels of schedulers enables achieving fairness in multiple dimensions, such as foreground task versus background tasks, controlling access to hard disk by different applications, etc. The overall goal of the scheduling system are to obtain fairness among the different tasks in the storage array, and to provide controls to the user for reduce noisiness of scheduling entities through the independent settings of IOPS and MBPS limits at each level of the scheduler hierarchy. In particular, application of the IOPS and MBPS limits are controlled by parent schedulers in the hierarchy (e.g., through allocation of resources that do not exceed limits set at child schedulers). Specifically, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.).

As shown in FIG. 5B, at the root is the CPU scheduler, also referred to herein as the root scheduler 555. For example, the root scheduler 555 is configured to allocate CPU resources to the different tasks, foreground or background, based on various factors including the amount of CPU cycles, or any other metric related to CPU consumption utilized during execution of the different tasks. As such, the root scheduler 555 selects a task and allocates CPU resources to execute that task throughout the universal hierarchy 500B. That is, root scheduler 555 is configured to allocate CPU resources between the foreground and background tasks, as previously described in FIG. 5A. That is, the root scheduler 555 allocates CPU cycles to foreground tasks that are scheduled by the FGIO scheduler 561, and to background tasks that are scheduled by a miscellaneous scheduler (not shown) and/or the garbage collection scheduler 557. For example, background tasks include garbage collection of obsolete data, compaction of data (e.g., merging contents of two half-filled segments into one full segment), creating snapshots of data, backup, and replication procedures, etc. In particular, a first portion of CPU resources is assigned to foreground tasks, and a second portion of CPU cycles is assigned to background tasks (e.g., garbage collection, NVRAM flush, replication, etc.). As such, a fair distribution of resources is achieved between foreground tasks and background tasks.

In embodiments, there are other schedulers below the root scheduler 555. For example, there may be a sub-hierarchy of schedulers that is configured for handling foreground tasks. Not all schedulers are shown for simplicity and clarity when disclosing embodiments that provide for allocation of CPU resources by schedulers under the FGIO scheduler 561 when scheduling IOs to a particular portion of a data storage system 102 in consideration of the IOPS and MBPS rate limits independently set at schedulers at all levels in the hierarchy 500B. For example, there may be other miscellaneous schedulers (e.g., first-in-first-out [FIFO]), garbage collection (GC) scheduler 557, Dbb Sync scheduler 556, etc.). As such, the schedulers are configured to allocate CPU resources to child schedulers based, in part, on the IOPS and MBPS limits of the child schedulers.

In particular, foreground FGIO scheduler 561 is configured for receiving an allocated amount of CPU resources from the root scheduler 555 for use in handling foreground tasks, and for fairly allocating those resources throughout the scheduler sub-hierarchy. For example, resource allocation may be achieved through equal distribution of resources at lower levels, or by using weights when distributing resources. The FGIO scheduler 561 creates four schedulers, including write admit scheduler, admit read scheduler, remote write admit scheduler, and continue scheduler, each of which is configured for allocating CPU resources to handle IOs directed at one or more scheduler entities (e.g., folders, volumes, virtual LUNs) to be executed across one or more core processors.

For purposes of brevity and clarity, the Admit scheduler 562 may be a collection of the four previously introduced schedulers, or other scheduler combinations. In particular, the Admit scheduler 562 implements and applies/manages the IOPS and MBPS limits as a whole, as representative of the IOPS and MBPS limits set at each of the underlying admit schedulers. For example, the Admit scheduler 562 in FIG. 5C manages IOPS for a mixture of reads and writes. In one embodiment, each of these admit schedulers (e.g., write, read, remote write, continue) schedule IOs and/or allocate resources across all of the underlying schedulers of the various core processors for the plurality of volumes. The Admit scheduler 562 may control IOPS allocation to an array in the data storage system. If the storage system includes multiple arrays, more than one Admit scheduler may be utilized, wherein one Admit scheduler controls IOPS allocation for a corresponding array.

For purposes of brevity and clarity, the continue scheduler 566 may also be configured for implementing and managing independent IOPS and MBPS limits, in one embodiment. In another embodiment, the continue scheduler 566 directly schedules its continue operations with each volume, without consideration of the IOPS and MBPS limits.

One or more folders may be included in the scheduler hierarchy 500B, wherein each folder is a collection of volumes and/or folders. A scheduler hierarchy may include one or more folders in a hierarchy. That is, a parent folder may include one or more children folders, such that a folder hierarchy exists. Each folder is used to allocate resources across all the underlying schedulers (e.g., array, folder, volume, LUN, etc.). For example, there may be one or more folders under the Admit scheduler 562 accessing one or more volumes. In general, folder F1 (575) under Admit scheduler 562 is configured to allocate resources to the various underlying volumes V1 and V2 without violation of the IOPS and MBPS limits set at the volume level. Also, folder F2 (585) under Admit scheduler 562 is configured to allocate resources to the various underlying volumes V1 and V2 without violation of the IOPS and MBPS limits set at the volume level. In another implementation, folder F2 (585) may access other volumes (e.g., V3, V4, etc.) instead of volumes V1 and V2. In still another implementation, folder F1 may be a write scheduler folder handling writes to volumes V1 and V2, and folder F2 may be a read scheduler folder handling reads to volumes V1 and V2. Though two folders are shown, other embodiments are well suited to handling fewer or additional folders, located at various locations in the hierarchy to manage IOPS and MBPS limits throughout.

Figure 5C:
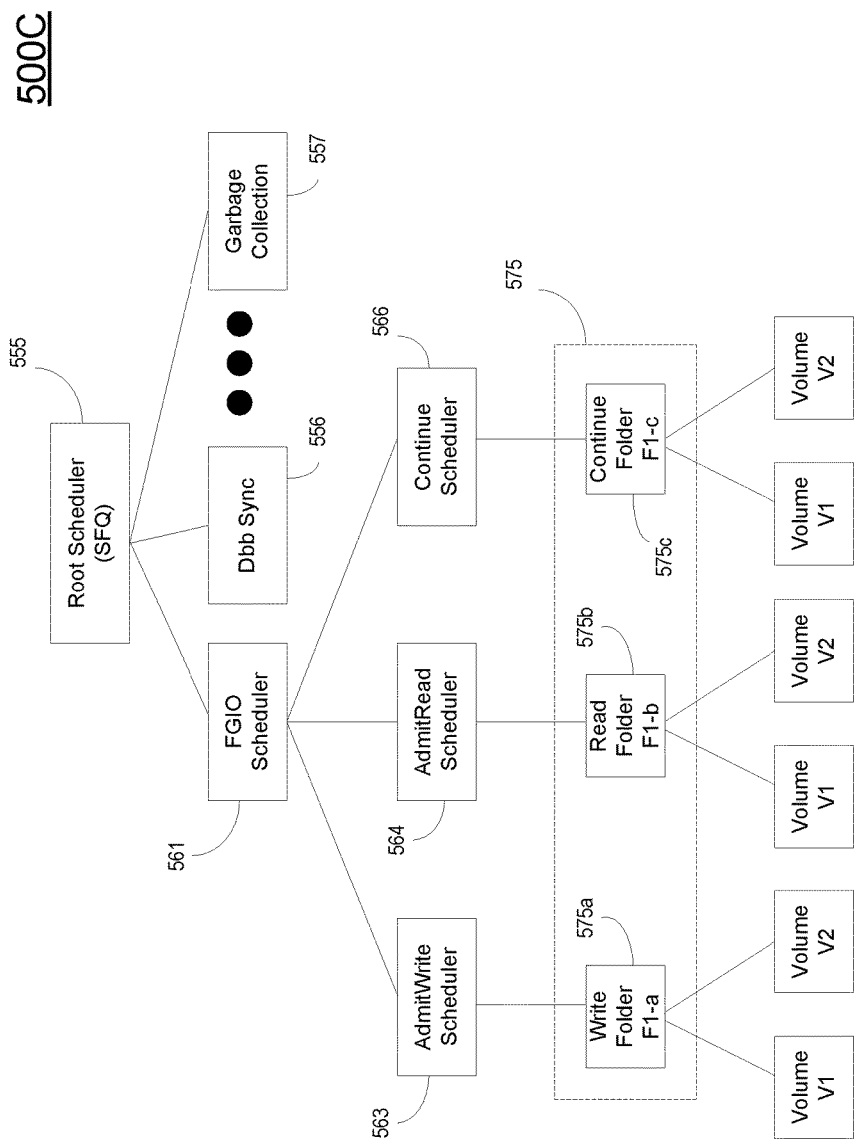
FIG. 5C is a block diagram of a scheduler hierarchy in a data storage system (e.g., including LUNs, volumes, etc.) including an illustration of multiple parent folders and child volumes, wherein the schedulers in the hierarchy are configured for fair allocation of CPU resources, and wherein IOPS and MBPS limits may be independently set at each of the schedulers, in accordance with one embodiment of the present disclosure.

FIG. 5C is a block diagram of a universal scheduler hierarchy 500C in a data storage system (e.g., including arrays, folders, LUNs, volumes, etc.) including an illustration of a parent folder and child volumes, wherein the schedulers in the hierarchy are configured for fair allocation of CPU resources, and wherein IOPS and MBPS limits may be independently set at each of the schedulers, in accordance with one embodiment of the present disclosure. Scheduler hierarchy 500C may be viewed as a more detailed view of the hierarchy shown in FIG. 5B.

In particular, the universal scheduler hierarchy 500C in a data storage system is configured to perform fair utilization of system resources through independently setting of IOPS and MBPS limits at each level of the hierarchy and the application/management of the limits when scheduling IOs to a particular portion of a data storage system 102. For clarity and illustration, the particular portion of the data storage system 102 is referenced as a virtual LUN throughout the application, though it may be a volume, or any other virtual partition (e.g., folder, array, etc.). The universal scheduler hierarchy 500C includes a root CPU scheduler 555, and a foreground (FGIO) flow scheduler 561, as well as other schedulers, such as Dbb Sync scheduler 556, garbage collector scheduler 557, etc. Schedulers in the hierarchy 500C know about the relative importance of tasks to be performed, including configured user parameters regarding priority/importance for allocation. A CPU scheduling system includes the hierarchy of schedulers 500C, wherein schedulers in the system operate cooperatively at different levels. For example, the CPU scheduling system determines the order in which tasks are processed (i.e., assigned CPU time) and how much CPU resources (e.g., CPU cycles) are allocated to the tasks.

As previously introduced, each scheduler in the hierarchy 500C operates on one or more schedulable entities, wherein entities handle any IO request (e.g., for performing IOs) or any work request (e.g., for performing background tasks). The overall goal of the scheduling system are to obtain fairness among the different tasks in the storage array, and to provide controls to the user for reduce noisiness of scheduling entities through the independent settings of IOPS and MBPS limits at each level of the scheduler hierarchy. In particular, application of the IOPS and MBPS limits are controlled by parent schedulers in the hierarchy (e.g., through allocation of resources that do not exceed limits set at child schedulers). Specifically, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.).

As shown in FIG. 5C, at the root is the CPU scheduler, also referred to herein as the root scheduler 555. For example, the root scheduler 555 is configured to allocate CPU resources to the different tasks, foreground or background, based on various factors including the amount of CPU cycles, or any other metric related to CPU consumption utilized during execution of the different tasks. For example, the root scheduler 555 allocates CPU cycles to foreground tasks that are scheduled by the FGIO scheduler 561, and to background tasks, previously described, that are scheduled by a miscellaneous scheduler (not shown) and/or the garbage collection scheduler 557. As such, a fair distribution of resources is achieved between foreground tasks and background tasks.

In embodiments, there are other schedulers below the root scheduler 555. For example, there may be a sub-hierarchy of schedulers that is configured for handling foreground tasks. Not all schedulers are shown for simplicity and clarity when disclosing embodiments that provide for allocation of CPU resources by schedulers under the FGIO scheduler 561 when scheduling IOs to a particular portion of a data storage system 102 in consideration of the IOPS and MBPS rate limits independently set at schedulers at all levels in the hierarchy 500C. Each of the schedulers is configured to allocate CPU resources to child schedulers based, in part, on the IOPS and MBPS limits of the child schedulers.

In particular, foreground FGIO scheduler 561 is configured for receiving an allocated amount of CPU resources from the root scheduler 555 for use in handling foreground tasks, and for fairly allocating those resources throughout the scheduler sub-hierarchy. For example, resource allocation may be achieved through equal distribution of resources at lower levels, or by using weights when distributing resources. The FGIO scheduler 561 creates four schedulers, including write admit scheduler 563 (referred to as AdmitWrite scheduler), admit read scheduler 564 (also referred to as AdmitRead scheduler), remote write admit scheduler (also referred to as RemoteAdmitWrite scheduler, not shown), and Continue scheduler 566, each of which is configured for allocating CPU resources to handle IOs directed at one or more scheduler entities (e.g., folders, volumes, virtual LUNs) to be executed across one or more core processors. Previously, in FIG. 5B, the four schedulers were represented as one Admit scheduler 562. In one embodiment, each of these schedulers schedule IOs and/or allocate resources across all of the underlying schedulers of the various core processors for the plurality of volumes.

In particular, the AdmitWrite scheduler 563 is configured to achieve admission control (e.g., through queuing) of local write, write same, unmap, and ATS IOs that are not yet admitted into the data storage system. The AdmitRead scheduler 564 is configured to schedule read IOs (e.g., through queuing) that are not yet admitted into the system. That is, the AdmitRead scheduler 564 is configured to achieve admission control for read IOs in the system. RemoteAdmitWrite scheduler is configured to achieve admission control (e.g., queue) over remote write, write same, unmap, and ATS IOs that are not yet admitted into the data storage system. For purposes of clarity and brevity, the RemoteAdmitWrite scheduler is not shown or discussed. Continue scheduler 566 is configured to queue previously admitted IOs. Each of the AdmitWrite 563, AdmitRead scheduler 564, and Continue scheduler 566 is configured to allocate resources to the various schedulers accessing the various virtual LUNs of the data storage system 102, as shown in FIG. 5C. That is, these schedulers allocate and schedule resources to handle IOs directed to one or more scheduler entities (e.g., folders, volumes, LUNs, etc.) as executed by a plurality of core processors.

One or more folders may be included in the scheduler hierarchy 500C, wherein each folder is a collection of volumes and/or folders. Each folder is used to allocate resources across all the underlying schedulers (e.g., array, folder, volume, LUN, etc.). For example, though only one folder 575 is shown, there may be one or more folders under the AdmitWrite 563, AdmitRead scheduler 564, and Continue scheduler 566 accessing one or more volumes. For simplicity, FIG. 5C shows one folder F1 (575) under the AdmitWrite 563, AdmitRead scheduler 564, and Continue scheduler 566, though other folders may also be included. That is, when using folders, a folder may include an admit write folder, an admit read folder, an admit remote write folder, and a continue folder. In particular, folder F1 includes write folder F1-a (575a) under the AdmitWrite scheduler 563, read folder F1-b (575b) under the AdmitRead scheduler 564, and continue folder F1-c (575b) under the Continue scheduler 566. Though the folder F1 (575) is shown under the Admit schedulers, other folders may be located at various locations in the hierarchy to manage IOPS and MBPS limits throughout.

In general, folder F1 (575) is configured to allocate resources to the various underlying volumes V1 and V2 without violation of the IOPS and MBPS limits set at the volume level. Specifically, write folder F1-a (575a) allocates resources to handle write IOs to the various volume scheduler instances V1 and V2 located below in the scheduler hierarchy. Also, read folder F1-b (575b) allocates resources to handle read IOs to the various volume scheduler instances V1 and V2 located below in the scheduler hierarchy. In addition, continue folder F1-c (575c) allocates resources to handle continue IOs to the various volume scheduler instances V1 and V2 located below in the scheduler hierarchy.

FIGS. 6A-6G are illustrations of various use cases showing the allocation of CPU resources through scheduler hierarchies in consideration of the IOPS and MBPS settings at schedulers at each level of the scheduler hierarchy, in accordance with embodiments of the present disclosure. The various use cases illustrate the allocation of IOPS throughout a scheduler hierarchy, but could be easily used to illustrate the allocation of MBPS throughout the scheduler hierarchy.

In one embodiment, an assumption is made that the schedulers (e.g., volumes) at a particular level for each of the scheduler hierarchies in FIGS. 6A-6F are operating under an equal workload. That is, when allocating CPU resources fairly, at least initially before considering IOPS limits, the assumption is made that the schedulers at the corresponding level have an equal workload or usage. The assumption is made for ease of explanation. In embodiments, there could be volumes with different workloads. In that case, CPU cycles, instead of IOPS, are distributed fairly (e.g., divided fairly) among all the volumes, and to each volume serves its allocated IOPS based on its share of allocated CPU cycles.

In addition, a general scheduler hierarchy is used for each of the use cases in FIGS. 6A-6F, wherein the scheduler hierarchy includes three levels (e.g., level 0, level 1, and level 2) for IOPS and MBPS management. Level 2 may be representative of an array level, for application of IOPS and MBPS limits to the entire array, such as at the admit scheduler 562 of FIG. 5B. Level 1 may be representative of a folder level, such as the folder F1 575 and folder F2 585 of FIG. 5B. Level 0 may be representative of a volume level, to include volumes V1, V2, and V3. The scheduler hierarchy in FIG. 6G is slightly different than the previously shown hierarchies, as will be described below.

In particular, at level 2 (e.g., Admit scheduler), one hundred thousand (100 k) IOPS are allocated to the scheduler hierarchy. The various use cases illustrate the allocation of the 100 k IOPS depending on IOPS limits set at various schedulers in the hierarchy, wherein IOPS limits are shown at corresponding schedulers by closed parenthesis, such as (XX IOPS). At level 1, two folders are shown folder F1 and folder F2. Folder F1 allocates CPU resources to volumes V1 and V2. Folder F2 allocates CPU resources to volumes V1, V2, and V3. Volume V3 is inactive in the use cases of FIGS. 6A-6F, as indicated by the dotted line connecting folder F2 and V3. In general, application of limits at each level is controlled by parent schedulers in the hierarchy in consideration of IOPS limits at both the parent level (cannot exceed) and the child level (cannot exceed).

Figure 6A:
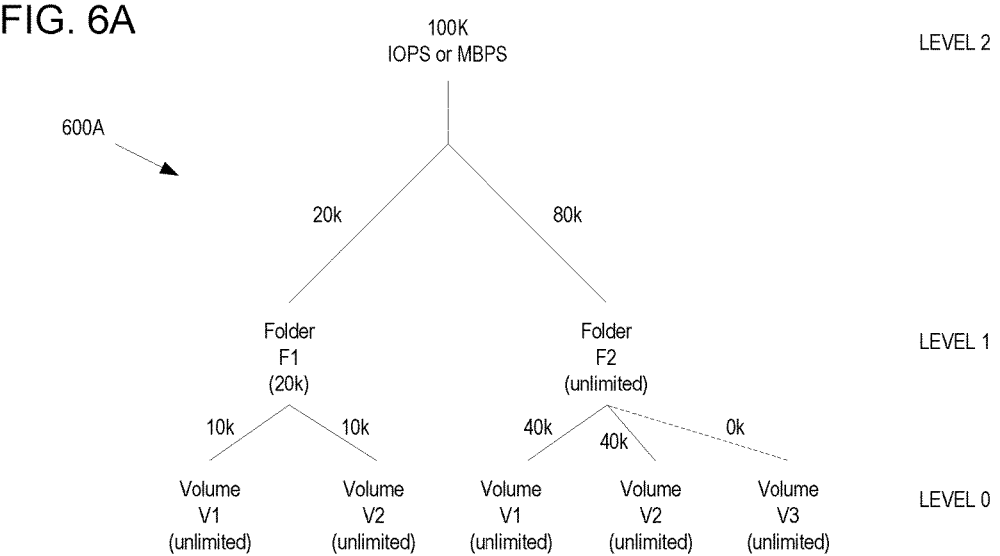
FIGS. 6A-6G are illustrations of various use cases showing the allocation of CPU resources through scheduler hierarchies in consideration of the IOPS and MBPS settings at schedulers at each level of the scheduler hierarchy, in accordance with embodiments of the present disclosure.

FIG. 6A shows the allocation of CPU resources (100 k IOPS) through scheduler hierarchy 600A in consideration of the IOPS and MBPS settings at schedulers at each level of the scheduler hierarchy, in accordance with one embodiment of the present disclosure. The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). From level 2, only 20 k IOPS is allocated to folder F1 because of its IOPS limit (20 k). As such, folder F2 is allocated the remaining IOPS—80 k.

Looking first at folder F1, IOPS are allocated fairly to the volumes below, subject to any IOPS limits. Since both volumes V1 and V2 have no IOPS limit (e.g., unlimited), IOPS are allocated with 50 percent (of 20 k) going to each volume. That is, each of volumes V1 and V2 is allocated 10 k IOPS.

Looking next to folder F2, IOPS are also allocated fairly to the volumes below, subject to any IOPS limits. Since both volumes V1 and V2 have no IOPS limit (e.g., unlimited), and volume V3 is inactive (and not considered in the allocation), IOPS are allocated with 50 percent (of 80 k) going to each of volumes V1 and V2. That is, each of volumes V1 and V2 is allocated 40 k IOPS. That is, the allocation of CPU resources also considers the load on each of the volumes (e.g., considering active or inactive status).

Figure 6B:
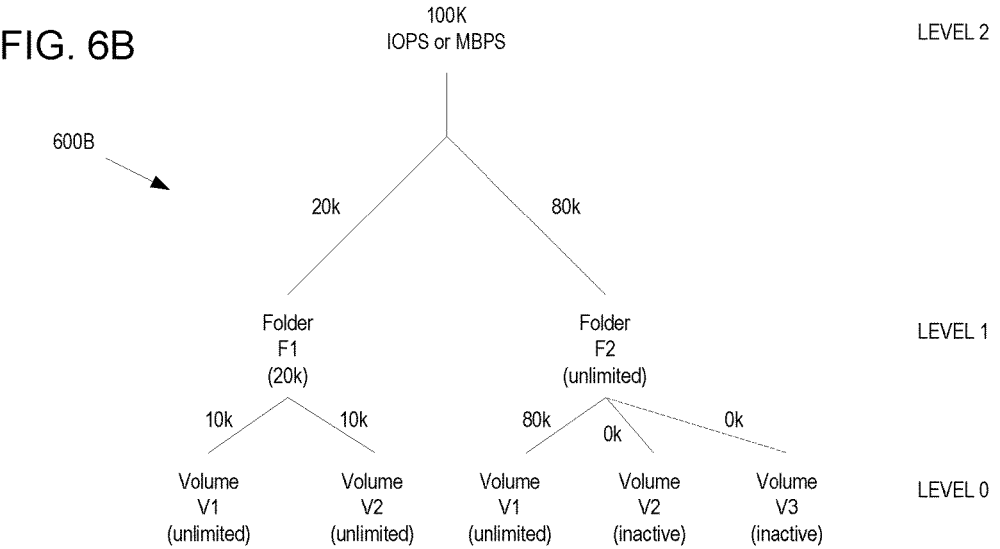

FIG. 6B shows the allocation of CPU resources (100 k IOPS) through scheduler hierarchy 600B in consideration of the IOPS and MBPS settings at schedulers at each level of the scheduler hierarchy, in accordance with one embodiment of the present disclosure. The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). From level 2, only 20 k IOPS is allocated to folder F1 because of its IOPS limit (20 k). As such, folder F2 is allocated the remaining IOPS—80 k.

Looking first at folder F1, IOPS are allocated fairly to the volumes below, subject to any IOPS limits. Just as in FIG. 6A, since both volumes V1 and V2 have no IOPS limit (e.g., unlimited), IOPS are allocated with 50 percent (of 20 k) going to each volume. That is, each of volumes V1 and V2 is allocated 10 k IOPS.

Looking next to folder F2, IOPS are also allocated fairly to the volumes below, subject to any IOPS limits. Since both volumes V2 and V3 are both inactive (and not considered in the allocation), IOPS are allocated with 100 percent (of 80 k) going to volume V1. That is, volume V1 is allocated 80 k IOPS. As shown, the allocation of CPU resources also considers the load on each of the volumes (e.g., considering active or inactive status).

Figure 6C:
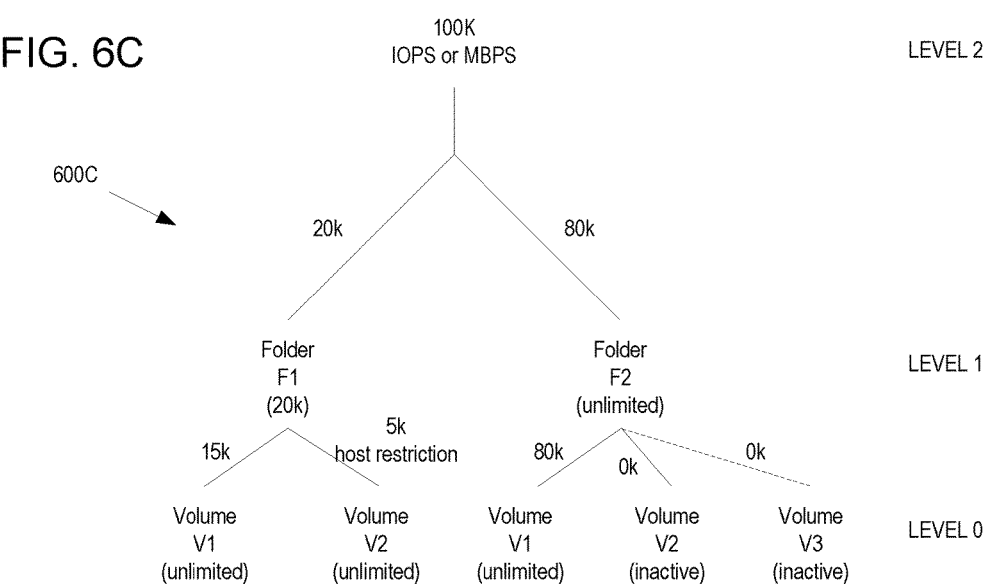

FIG. 6C shows the allocation of CPU resources (100 k IOPS) through scheduler hierarchy 600C in consideration of the IOPS and MBPS settings at schedulers at each level of the scheduler hierarchy, in accordance with one embodiment of the present disclosure. The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). As such, from level 2, only 20 k IOPS is allocated to folder F1 because of its IOPS limit (20 k). As such, folder F2 is allocated the remaining IOPS—80 k.

Looking first at folder F1, IOPS are allocated fairly to the volumes below, subject to any IOPS limits. Since both volumes V1 and V2 have no IOPS limit (e.g., unlimited), IOPS are initially fairly allocated with 50 percent (of 20 k) going to each volume. That is, each of volumes V1 and V2 is initially allocated 10 k IOPS. However, the allocation of resource also considers the load on the volumes. As shown, the load or handling capacity of volume V2 is limited to 5 k IOPS. For example, the host making IOPS requests is only able to demand 5 k IOPS on volume V2, even though V2 can handle a higher IOPS demand. As such, because volume V2 is constrained to 5 k IOPS, folder F1 allocates 5 k IOPS to volume V2, and the remaining IOPS will be allocated to volume V1, subject to any IOPS limit. That is, volume V1 is allocated 15 k IOPS.

Looking next to folder F2, IOPS are also allocated fairly to the volumes below, subject to any IOPS limits. Since both volumes V2 and V3 are both inactive (and not considered in the allocation), IOPS are allocated with 100 percent (of 80 k) going to volume V1. That is, volume V1 is allocated 80 k IOPS. As shown, the allocation of CPU resources also considers the load on each of the volumes (e.g., considering active or inactive status).

Figure 6D:
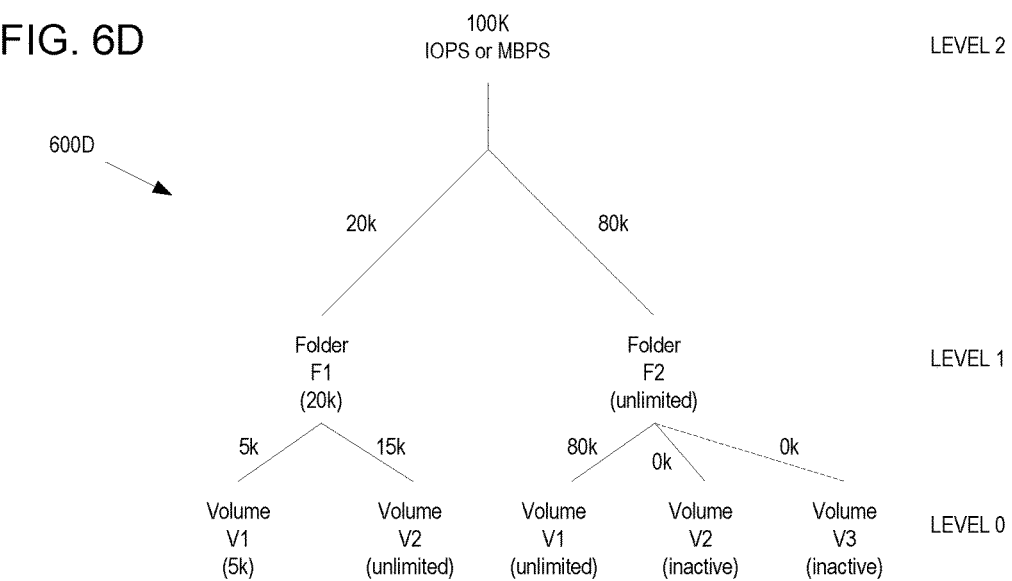

FIG. 6D shows the allocation of CPU resources (100 k IOPS) through scheduler hierarchy 600D in consideration of the IOPS and MBPS settings at schedulers at each level of the scheduler hierarchy, in accordance with one embodiment of the present disclosure. The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). From level 2, only 20 k IOPS is allocated to folder F1 because of its IOPS limit (20 k). As such, folder F2 is allocated the remaining IOPS—80 k.

Looking first at folder F1, IOPS are allocated fairly to the volumes below, subject to any IOPS limits. Since volume V1 has an IOPS limit of 5 k, which is controlling, only 5 k IOPS are allocated to volume V1. The remaining IOPS is allocated to volume V2 (with unlimited IOPS limit). That is, volume V2 is allocated 15 k IOPS.

Looking next to folder F2, IOPS are also allocated fairly to the volumes below, subject to any IOPS limits. Since both volumes V2 and V3 are both inactive (and not considered in the allocation), IOPS are allocated with 100 percent (of 80 k) going to volume V1. That is, volume V1 is allocated 80 k IOPS. As shown, the allocation of CPU resources also considers the load on each of the volumes (e.g., considering active or inactive status).

Figure 6E:
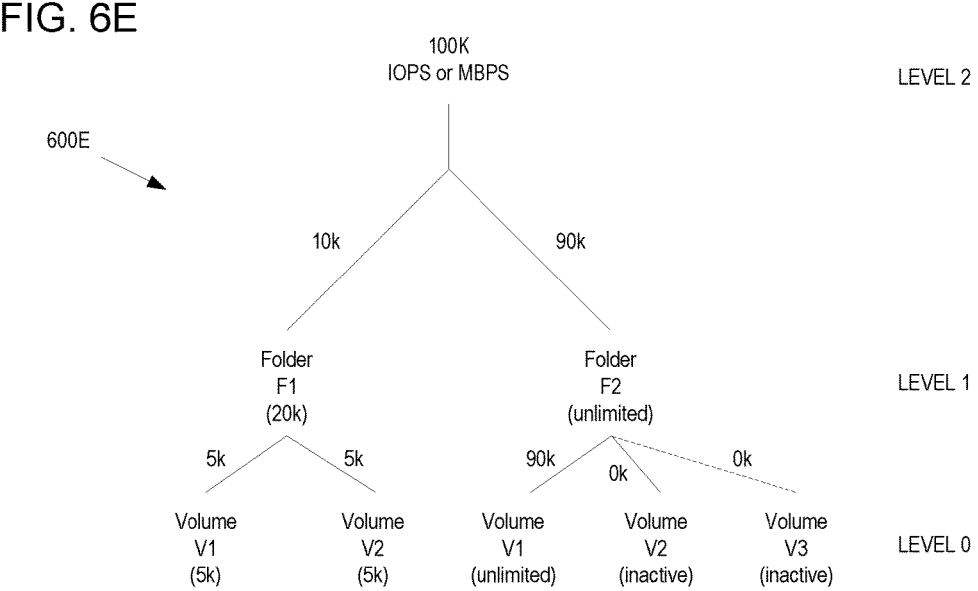

FIG. 6E shows the allocation of CPU resources (100 k IOPS) through scheduler hierarchy 600E in consideration of the IOPS and MBPS settings at schedulers at each level of the scheduler hierarchy, in accordance with one embodiment of the present disclosure. In particular, FIG. 6E illustrates the case where the IOPS limits of the child schedulers control, even though the parent scheduler has additional IOPS to allocate. The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). From level 2, only 20 k IOPS is initially allocated to folder F1 because of its IOPS limit (20 k). As such, folder F2 is initially allocated the remaining IOPS—80 k. This initial allocation is subject to change depending on the application of individual IOPS and MBPS limits at lower levels, and the distribution of residue or remaining IOPS, as will be described more fully below.

Looking first at folder F1, IOPS are allocated fairly to the volumes below, subject to any IOPS limits. Since both volumes V1 and V2 each have a 5 k IOPS limit, which are controlling, only 5 k IOPS are allocated to each of volumes V1 and V2. This is such, even though 20 k IOPS are initially allocated to the parent scheduler, folder F1. As such, there is a 10 k IOPS residue or remainder from the initial 20 k IOPS allocation, after application of the IOPS limits at level 0. The residue is fairly distributed or allocated between the schedulers the parent level, which are the remaining folders at level 1. That is, the residue of 10 k is transferred to folder F2, such that folder F2 is now allocated 90 k IOPS (the initial allocation of 80 k plus the residue of 10 k). The transfer of the residue implements the work conserving principle.

Looking next to folder F2, IOPS are also allocated fairly to the volumes below, subject to any IOPS limits. Since both volumes V2 and V3 are both inactive (and not considered in the allocation), IOPS are allocated with 100 percent (of 80 k) going to volume V1. That is, volume V1 is allocated 80 k IOPS. As shown, the allocation of CPU resources also considers the load on each of the volumes (e.g., considering active or inactive status).

Figure 6F:
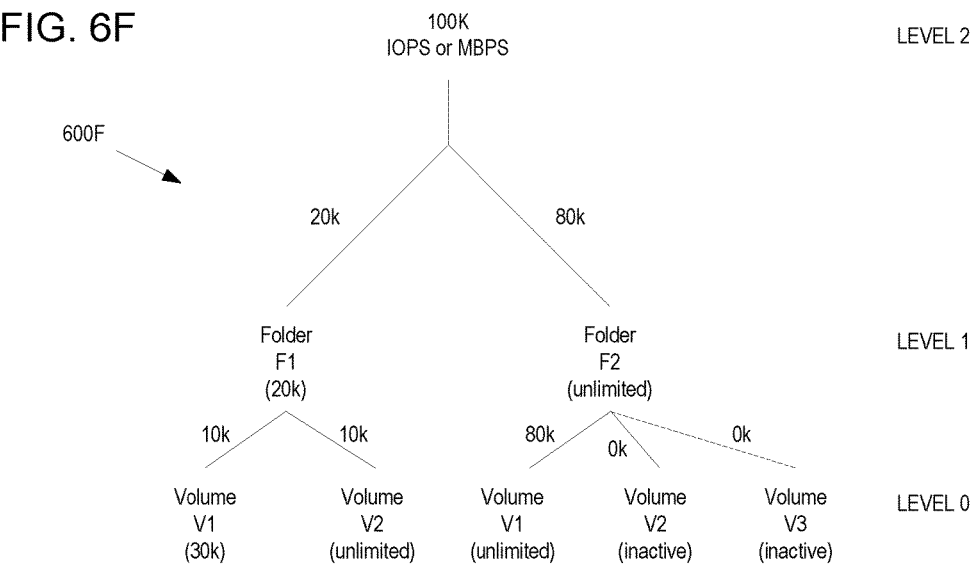
Figure 6G:
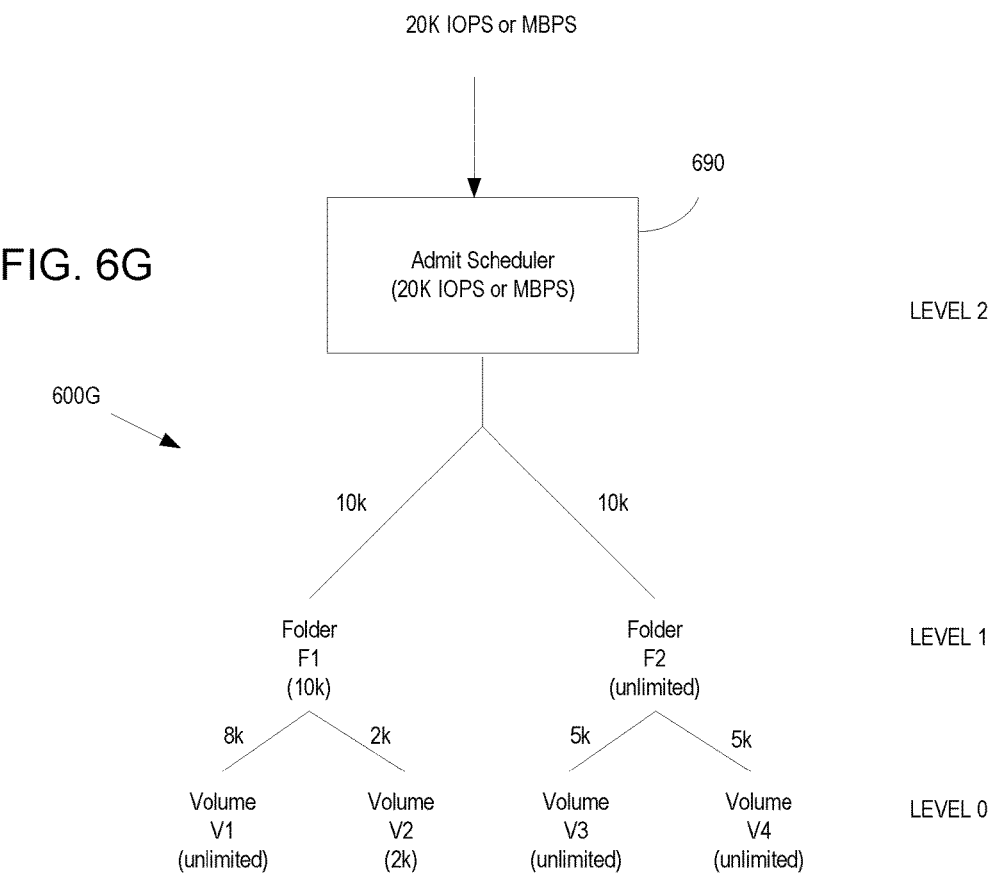

FIG. 6F shows the allocation of CPU resources (100 k IOPS) through scheduler hierarchy 600F in consideration of the IOPS and MBPS settings at schedulers at each level of the scheduler hierarchy, in accordance with one embodiment of the present disclosure. In particular, FIG. 6F illustrates the case where the IOPS limits of the child schedulers do not control, but the parent IOPS limit does control (e.g., where the IOPS limit of the child is greater than the limit on the parent). The IOPS flowing from level 2 are fairly allocated subject to IOPS limits at lower levels. Initially, both folder F1 and F2 would fairly be allocated 50 percent of 100 k IOPS; however, this is subject to the IOPS limit at folder F1, which has an IOPS limit of 20 k (e.g., set by a user). On the other hand, folder F2 has no limit (e.g., unlimited IOPS limit). In addition, each of the folders V1, V2, and V3 have no IOPS limits (e.g., unlimited). From level 2, only 20 k IOPS is allocated to folder F1 because of its IOPS limit (20 k). As such, folder F2 is allocated the remaining IOPS—80 k.

Looking first at folder F1, IOPS are allocated fairly to the volumes below, subject to any IOPS limits. Volume V1 has an IOPS limit of 30 k, which is greater than the IOPS limit set on the parent scheduler, folder F1 (20 k). Volume V2 has no IOPS limit. As such, fair allocation remains. That is, each of volumes V1 and V2 are allocated 10 k IOPS, even though both have higher IOPS limits.

In one embodiment, a determination is made that the IOPS limit of the child scheduler is greater than the IOPS limit of the parent scheduler, and that determination is stored for later analysis. Further, notification that the IOPS limit of the child scheduler is greater than the IOPS limit of the parent scheduler may be delivered to the user. A child scheduler having an IOPS and/or MBPS limit that is greater than the limit set on the parent is not an improper configuration. That is, it can be proper to set the IOPS and/or MBPS limit that is greater than the parent folder IOPS and/or MBPS limit. For example, this may be helpful in cases where volumes are moved to a folder that has a higher limit or no limit at all. In this configuration, the user may expect the system to limit these volumes with their respective IOPS and/or MBPS limits.

Looking next to folder F2, IOPS are also allocated fairly to the volumes below, subject to any IOPS limits. Since both volumes V2 and V3 are both inactive (and not considered in the allocation), IOPS are allocated with 100 percent (of 80 k) going to volume V1. That is, volume V1 is allocated 80 k IOPS. As shown, the allocation of CPU resources also considers the load on each of the volumes (e.g., considering active or inactive status).

FIG. 6G shows the allocation of CPU resources through scheduler hierarchy 600G in consideration of the IOPS and MBPS settings at schedulers at each level of the scheduler hierarchy, in accordance with one embodiment of the present disclosure. In particular, FIG. 6G illustrates the case where limits are set at different levels of the scheduler hierarchy. As shown, Admit scheduler 690 is located at level 2 of the hierarchy, wherein the IOPS flowing from level 2 are fairly allocated subject to IOPS limits at lower levels. Admit scheduler 690 has an IOPS limit of 20 k, such that it is allocated a maximum of 20 k from its parent scheduler. In this case, scheduler 690 is receiving the maximum of its IOPS limit. Initially, both folder F1 and F2 would fairly be allocated 50 percent of 20 k IOPS; however, this is subject to the IOPS limit at folder F1, which has an IOPS limit of 10 k (e.g., set by a user). In this case, the IOPS limit for folder F1 matches the fair distribution of 10 k, and as such fair allocation is unchanged. The remaining IOPS allocation is delivered to folder F2, which has no IOPS limit. That is, folder F2 is allocated 10 k IOPS.

Looking first at folder F1, IOPS are allocated fairly to the volumes below, subject to any IOPS limits. Fair allocation dictates that 5 k IOPS would be allocated to each of the volumes V1 and V2, subject to corresponding IOPS limits. As shown, volume V1 has no IOPS limit (unlimited), and volume V2 has a 2 k IOPS limit. As such, volume V2 is allocated 2 k IOPS, which is the maximum of its IOPS limit. The remaining IOPS would be redistributed to the other volumes, such that volume V1 would be allocated 8 k IOPS.

Looking at folder F2, IOPS are allocated fairly to the volumes below, subject to any IOPS limits. Volumes V3 and V4 have no IOPS limit (unlimited). As such, fair allocation remains. That is, each of volumes V3 and V4 are allocated 5 k IOPS.

Figure 7:
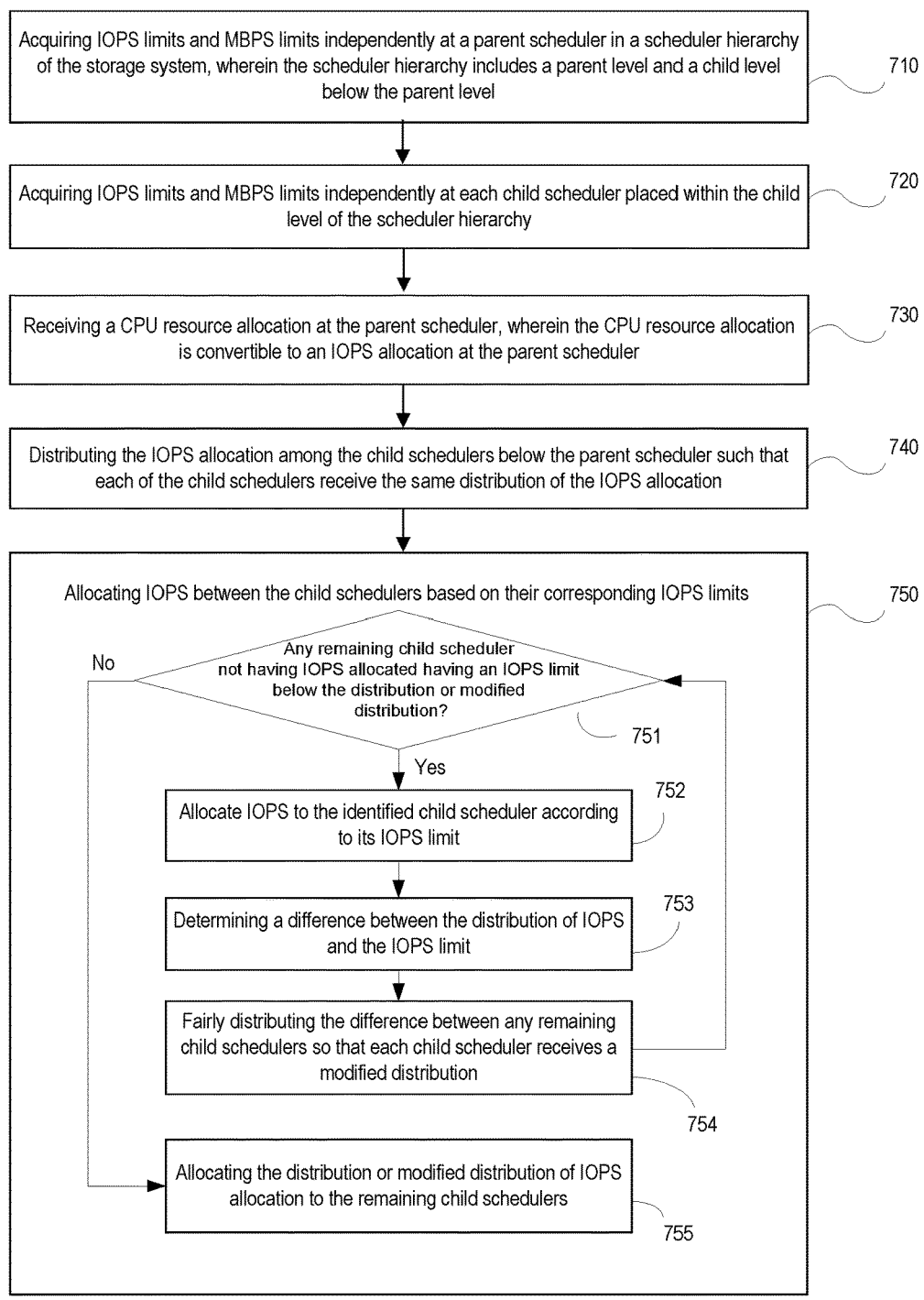
FIG. 7 is a flow diagram illustrating a method for the implementation and management of IOPS and MBPS limits independently set at schedulers of a scheduler hierarchy, in accordance with one embodiment of the present disclosure.

FIG. 7 is a flow diagram 700 illustrating a method for the implementation and management of IOPS and MBPS limits that are independently set at schedulers of a scheduler hierarchy, in accordance with one embodiment of the present disclosure. In particular, flow diagram 700 is performed to provide the fair utilization of system resources of a data storage system by independent IOPS and MBPS limits defined at each level of a scheduler hierarchy, and the application/management of the limits when allocating system resources through the hierarchy. Although the method outlined in FIG. 7 is described in relation to IOPS allocation, other embodiments are well suited to applying the method of FIG. 7 when allocating MBPS through the scheduler hierarchy. In one embodiment, flow diagram 700 is implemented within controller 104, and scheduler instances of FIGS. 5A-5C.

Application of limits at each level is controlled by parent schedulers in the hierarchy. In particular, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.). For example, a child scheduler (e.g., volume) may have a 20 k IOPS limit, while its parent scheduler (e.g., folder) may have a 10 k IOPS limit. On the other hand, application of the limits at a particular level is constrained by limits at higher levels. Using the same example, the volume (having a 20 k IOPS limit) is restricted to a 10 k IOPS limit, as set by its parent scheduler hierarchy. In that manner, a scheduler can be moved between scheduler hierarchies without having to redefine its IOPS and MBPS limits. In the example provided above, the volume (child scheduler) is limited to 10 k IOPS limit set by its parent folder scheduler, even though the volume has a defined IOPS limit of 20 k. As such, the volume can be moved to another scheduler hierarchy having a parent folder scheduler having no IOPS limits (no maximum). As such, volume now may apply its full 20 k IOPS limit without restriction.

At 710, the method includes acquiring IOPS limits and MBPS limits independently at a parent scheduler in a scheduler hierarchy of the storage system, wherein the scheduler hierarchy includes a parent level and a child level below the parent level. The parent scheduler may be one of an array scheduler, folder scheduler, volume scheduler, LUN scheduler, etc. One or more child schedulers may be located below the parent scheduler in the scheduler hierarchy. The parent scheduler may be one of a volume, folder, or array, wherein the folder is a collection of at least one of volumes and folders, and the array is a collection of at least one of arrays, folders, and volumes. In addition, the parent scheduler may be a tenant scheduler.

In addition, at 720, the method includes acquiring IOPS limits and MBPS limits independently at each child scheduler placed within the child level of the scheduler hierarchy. As such, IOPS and MBPS limits may be independently set at each of the schedulers in the scheduler hierarchy. In particular, an IOPS limit at a scheduler may not be dependent on or a function of the MBPS limit at the scheduler, and vice versa. For example, the MBPS limit at a corresponding scheduler is not a normalization (e.g., multiplying factor defined as a fixed block size) of the IOPS limit. In addition, the IOPS and MBPS limits for a particular scheduler at a corresponding level can be defined without consideration of any other scheduler in the hierarchy, such that the defined limit is not restrained by limits of scheduler at higher levels (e.g., parent, grandparent, etc.). The child scheduler is one of a volume and folder, wherein the folder is a collection of at least one of volumes and folders.

For example, an acquired IOPS limit may be set at a first child scheduler in the scheduler hierarchy, wherein the first child scheduler is placed within the child level. In addition, an acquired MBPS limit may be set at the first child scheduler, wherein the acquisition and setting of the MBPS limit at the first child scheduler is independent of the IOPS limit at the first child scheduler. In addition, IOPS and MBPS limits may be set at additional child schedulers. For example, another IOPS limit may be at a second child scheduler, wherein the second child scheduler is placed within the child level. Also, another MBPS limit is set at the second child scheduler, wherein the MBPS limit at the second child scheduler is independent of the IOPS limit at the second child scheduler. Further, an IOPS limit and MBPS limit may also be set at the parent scheduler in the scheduler hierarchy, wherein the IOPS limit at the parent scheduler is independent of the MBPS limit at the parent scheduler. IOPS and MBPS limit independence can be implemented in the scheduler hierarchy of embodiments because CPU cycles are allocated to each volume/folder/scheduler, and furthermore based on the type of workload, the volume/folder/scheduler will convert the CPU cycles to IOPS/MBPS.

At 730, the method includes receiving a CPU resource allocation at the parent scheduler. In one embodiment, the CPU allocation (e.g., allocation of CPU resource) is convertible to an IOPS allocation at the parent scheduler. That is, an IO that is received can be analyzed to determine the number of CPU cycles it will consume. In turn, the CPU cycles consumed can be converted to an IOPS value over a period of time.

At 740, the method includes distributing the IOPS allocation among the child schedulers below the parent scheduler. In one example, the distribution is performed fairly. This is performed without consideration of IOPS limits, at this moment to obtain a baseline allocation. As such, each of the child schedulers receive approximately the same distribution of the IOPS allocation.

From the baseline allocation determined above, further modifications to the allocation may be performed. In particular, at 750, the method includes allocating IOPS from the IOPS allocation between the child schedulers based on their corresponding IOPS limits. As shown, the operations at 750 are iteratively performed until the IOPS allocation is distributed among the child schedulers.

Specifically, decision step 751 determines whether any child scheduler, that does not have any allocation of IOPS, has an IOPS limit below the fair distribution. If no child scheduler is identified, then at 755, the fair distribution (e.g., same distribution) of the IOPS allocation is allocated to the child schedulers.

On the other hand, if a child scheduler is identified a 751 as having an IOPS limit below the fair distribution, then operation 752 is performed. For example, the parent scheduler may have 20 k IOPS allocation, with two child schedulers. Fair distribution allows for 10 k IOPS to be allocated each to the child schedulers equally. However, if one child scheduler has an IOPS limit of 5 k (which is below the fair distribution), this is identified at 751. As such, at operation 752, IOPS are allocated to the identified child scheduler according to its IOPS limit. In the example provided above, the child scheduler would be allocated 5 k IOPS.

At 753, the initial, distribution must still be allocated among the remaining child schedulers. In particular, a difference between the distribution of IOPS to the above identified child scheduler and the fair distribution is determined. This difference is distributed between any remaining child schedulers so that each child scheduler receives a modified distribution of the initial, fair distribution. This distribution may also be performed fairly. Specifically, to maintain work conservation the difference is applied to the remaining IOPS of the initial fair distribution of the IOPS allocation to generate a new, or modified distribution of IOPS to be distributed among the remaining child schedulers. In one embodiment, the distribution may occur dynamically (e.g., every few milliseconds), such that it does not occur statically.

The operations at 751-754 may be performed iteratively until the IOPS allocation is distributed among the child schedulers, taking into account their individual IOPS limits. That is, the application of limits at each level controls the allocation of IOPS to schedulers at that level. Of course, this allocation may be constrained by a parent IOPS limit that puts an upper limit on the total distribution of IOPS, even though the IOPS limits at the child schedulers may be greater than the IOPS limit at the parent scheduler. For example, in a two iteration process, a first child scheduler may be determined to have a first IOPS limit below the fair distribution of the IOPS allocation. IOPS are allocated to the first child scheduler according to the first IOPS limit. A first difference is determined between the fair or same distribution of the IOPS allocation and the first IOPS limit, and this difference is fairly distributed between first remaining child schedulers (not including the first child scheduler) located below the parent scheduler. In addition, a second child scheduler may be determined to have a second IOPS limit below the modified distribution of the IOPS allocation, wherein the modified distribution accounts for the same or fair distribution of the IOPS allocation and the first difference (that is fairly distributed). IOPS are allocated to the second child scheduler according to the second IOPS limit. A second difference is determined between the modified distribution of the IOPS allocation and the second IOPS limit, and this difference is fairly distributed between second remaining child schedulers (not including the first and second child schedulers) located below the parent scheduler.

Embodiments described herein allow for transfer of IOPS and MBPS limits of entities throughout the scheduler hierarchy. For example, a volume may be moved from one folder to another. The IOPS and MBPS limits of that volume are automatically applied under the modified hierarchy. For example, when a child scheduler is moved to another folder in the flow diagram of FIG. 7, the IOPS allocation is again fairly distributed among the remaining child schedulers below the parent scheduler, such that each of the child schedulers receive approximately the same distribution of the IOPS allocation. In this case, the distribution would be greater, as one volume having moved is no longer allocated any resources under that parent allocation. That is, the modified distribution of the initial IOPS allocation is distributed between the remaining child schedulers, and in consideration of their corresponding IOPS limits.

Figure 8A:
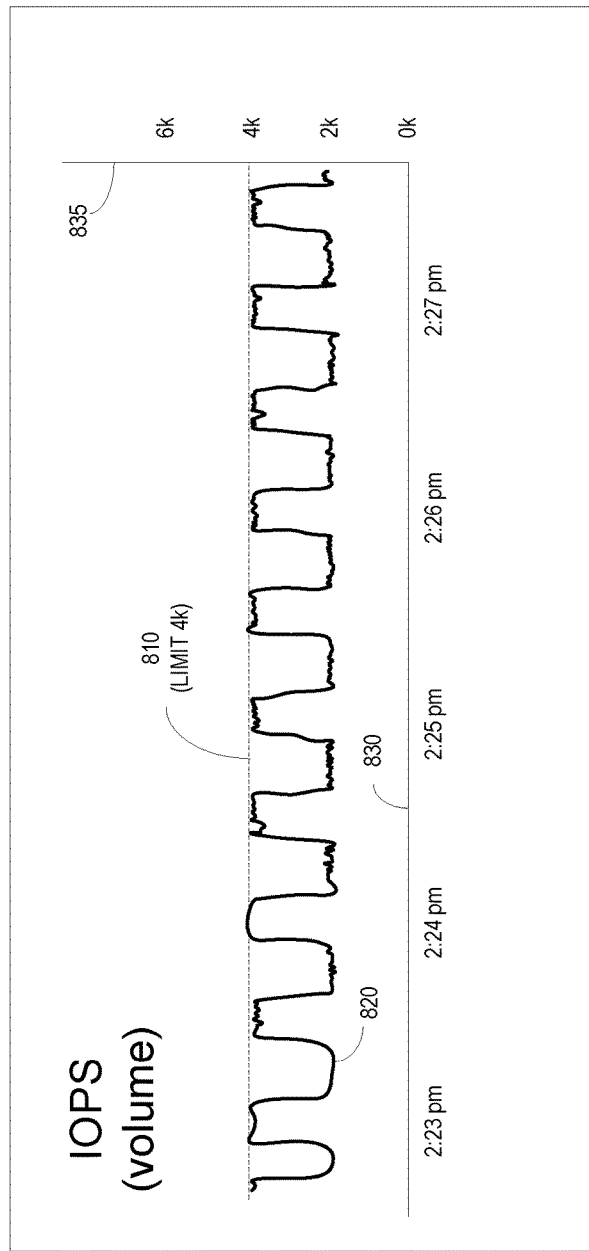
FIG. 8A is an illustration of a user interface showing the allocation of IOPS to a volume along a timeline and the application of an IOPS limit for the volume of a data storage system, in accordance with one embodiment of the present disclosure.

FIG. 8A is an illustration of a user interface 800A showing the allocation of IOPS to a volume along a timeline 830, and the application of an IOPS limit 810 for the volume of a data storage system, in accordance with one embodiment of the present disclosure. As shown, timeline 830 shows the IOPS usage for the volume for a period of time (e.g., between 2:23 pm to 2:27 pm). Axis 835 shows the values for IOPS usage from 0 k, to beyond 6 k IOPS. Measured IOPS usage is shown by line 820, and ranges between 0 k to 4 k, which is the upper limit as set by the IOPS limit 810 (e.g., 4 k IOPS) for the volume. That is, IOPS usage is constrained by the IOPS limit 810, and will not perceptively go higher than the limit, for an appreciable period of time.

Figure 8B:
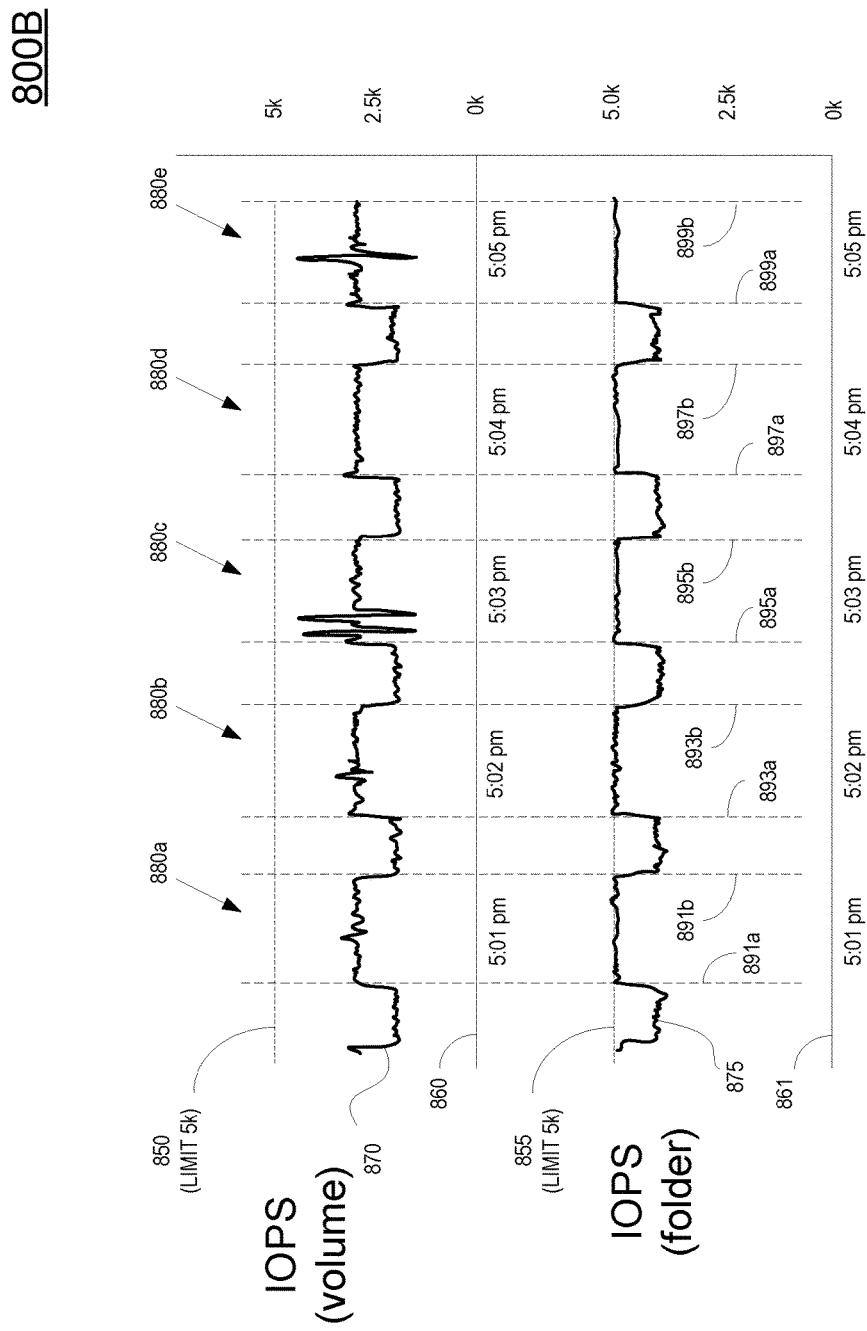
FIG. 8B is an illustration of a user interface showing the allocation of IOPS to a volume as restricted by an IOPS limit and the allocation of IOPS to a parent folder as restricted by another IOPS limit along a timeline, wherein the alignment between the allocations of IOPS to the volume and folder provides an explanation as to why the allocation of IOPS at the volume was restricted at a particular moment, in accordance with one embodiment of the disclosure.

FIG. 8B is an illustration of a user interface 800B showing the allocation of IOPS to a volume as restricted by an IOPS limit and the allocation of IOPS to a parent folder as restricted by another IOPS limit along a timeline, wherein the alignment between the allocations of IOPS to the volume and folder provides an explanation as to why the allocation of IOPS at the volume was restricted at a particular moment, in accordance with one embodiment of the disclosure.

In particular, timeline 861 shows the IOPS usage for a folder for a period of time (e.g., between 5:01 pm to 5:05 pm). Measured IOPS usage for the folder is shown by line 875, and ranges between 0 k to 5 k IOPS, which is the upper limit as set by the IOPS limit 855 for the folder. That is, IOPS usage is constrained by the IOPS limit 855, and will not perceptively go higher than the limit, for an appreciable period of time.

In addition, timeline 860 shows the IOPS usage for a volume for the same period of time. Measured IOPS usage for the volume is shown by line 860, and ranges between 0 k to 2.5 k IOPS. The upper IOPS limit 850 of the volume is set to 5 k IOPS, and as such, there are some values that spike beyond 2.5 k. The user interface 800A is unable to convey an explanation as to why the IOPS usage for the volume is constrained to 2.5 k IOPS which is below its IOPS limit of 5 k. However, the user interface 800B of FIG. 8B can convey an explanation.

In particular, sets of lines are shown that indicate periods of time when the folder is limited by its IOPS limit. For example, lines 891a-891b show a period 880a of time where the folder has reached its upper limit of 5 k; lines 893a-893b show a period 880b of time where the folder has reached its upper limit; lines 895a-891b show a period 880c of time where the folder has reached its upper limit; lines 897a-891b show a period 880d of time where the folder has reached its upper limit; and lines 899a-891b show a period 880d of time where the folder has reached its upper limit.

Coincidently, the IOPS usage for the volume as shown by line 870 is also constrained in the same periods of time 880*a*-880*d* to 2.5 k IOPS, even though the IOPS limit for the volume is higher—at 5 k IOPS. User interface 800B illustrates that the IOPS usage for the volume is constrained by the IOPS usage and allocation at the parent folder. For example, in the case where the folder has two child schedulers (e.g., volumes V1 and V2), where the IOPS limit for the folder is 5 k, and the IOPS limits for the volumes are also 5 k. Because the allocation of CPU resources cannot exceed that allocated to the folder, the volumes are allocated 2.5 k IOPS each under a fair distribution, even though their IOPS limits are higher—at 5 k IOPS. As such, when the folder is limited in its IOPS usage to its upper limit, that would constrain the allocation of resources to each of the volumes, as shown in periods of time 880*a*-880*d*. Moreover, the regions above the IOPS usage line 870 in periods of time 880*a*-880*d* may be highlighted (e.g., colored, cross-hatched, etc.) to show folder throttling. That is, even though IOPS usage line 870 does not exceed the volume limit at line 850, there is throttling of IOPS due to the folder limit line 855 at the parent folder in period of time 880*a*-880*d*. These highlighted areas may be identified as folder throttle bands which affect the volume.

Figure 9:
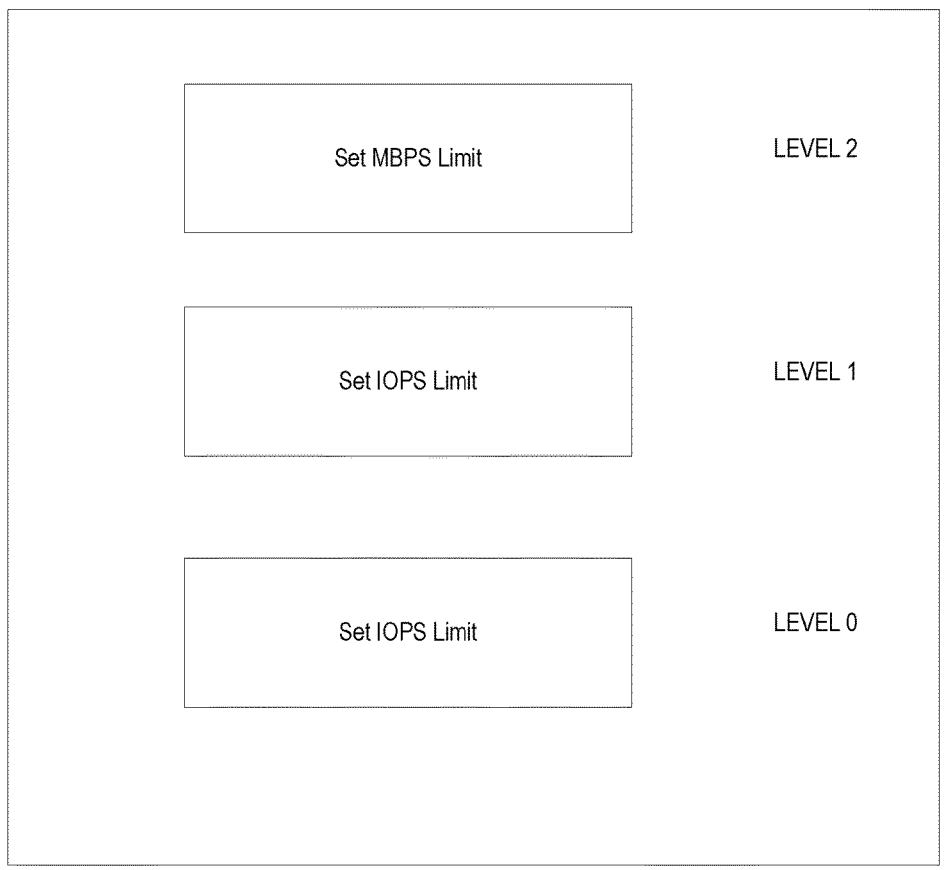
FIG. 9 is an illustration of setting IOPS and MBPS limits at varying levels of a scheduler hierarchy, in accordance with one embodiment of the present disclosure.

FIG. 9 is an illustration of setting IOPS and MBPS limits at varying levels of a scheduler hierarchy 900, in accordance with one embodiment of the present disclosure. For example, the system may impose an internal throughput limitation (e.g., MBPS limit) at level 2, such as an array level. As an illustration, even though the system is capable of a higher throughput, the system may be throttled to have a lower performance. In that manner, different models of the same system can be generated, each model having a different level of performance (e.g., throughput). The user is unable to change the limit at the array level, for example. However, the user is able to manage the IOPS and MBPS limits at lower levels of the scheduler hierarchy 900. For instance, the user may impose an IOPS limit at level 1 (e.g., folders), and a different IOPS limit at level 0 (e.g., volumes).

Figure 10A:
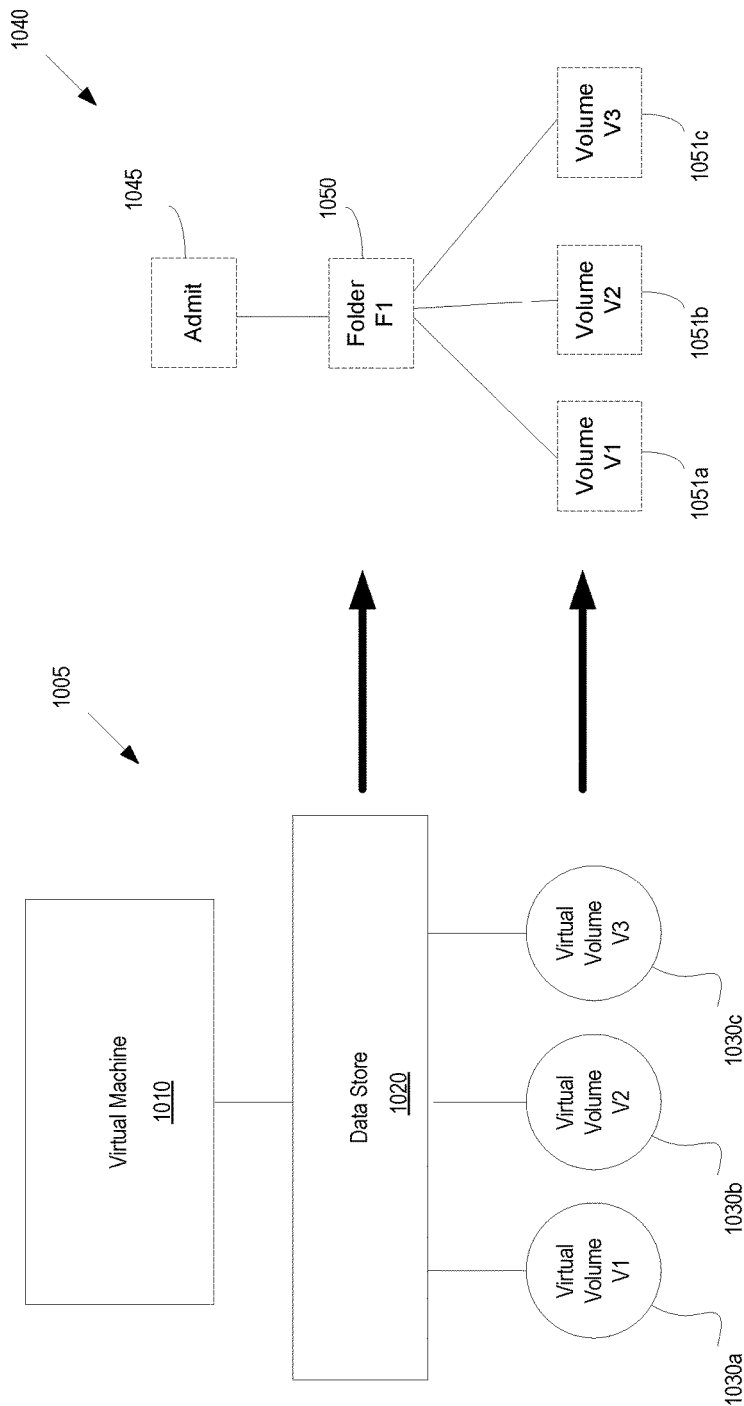
FIG. 10A is an illustration of placing IOPS and MBPS limits on a virtual machine (VM), in accordance with one embodiment of the present disclosure.

FIG. 10A is an illustration of placing IOPS and MBPS limits on a virtual machine (VM), in accordance with one embodiment of the present disclosure. For example, one or more VMs may be implemented at a back-end server through a network, such as a cloud-based computer system 1005. System 1005 provides computer processing resources (e.g., processing power, storage, etc.) to users over the network. As shown, VM 1010 accesses a data store 1020 of the cloud-based system 1005. Data store 1020 includes one or more virtual volumes. As shown VM 1010 is associated with and can access virtual volume V1 (1030*a*), volume V2 (1030*b*), and volume V3 (1030*c*).

IOPS and MBPS limits may be placed on VM 1010 through a corresponding scheduler hierarchy 1040 of a data storage system. Specifically, the data store 1020 may be mapped to a level in the scheduler hierarchy 1040, such as at a folder level (e.g., at folder F1 1050). In addition, each of the virtual volumes V1-V3 may be mapped to volumes V1-V3 of the data storage system. For example, virtual volume V1 (1030*a*) is mapped to volume V1 (1051*a*); virtual volume V2 (1030*b*) is mapped to volume V2 (1051*b*); and virtual volume V3 (1030*c*) is mapped to volume V3 (1051*c*).

Independent IOPS and MBPS limits may be placed at various schedulers of the scheduler hierarchy 1040 to control resource allocation for the VM 1010. For example, independent IOPS and MBPS limits may be placed at the folder F1 (1050) to control resource allocation and usage at the data store level 1020. Also, independent IOPS and MBPS limits may be placed at each of the volumes V1-V3. For example, independent IOPS and MBPS limits may be placed at volume V1 (1051*a*) to control resource allocation and usage at virtual volume V1 (1030*a*). In addition, independent IOPS and MBPS limits may be placed at volume V2 (1051*b*) to control resource allocation and usage at virtual volume V2 (1030*b*). Also, independent IOPS and MBPS limits may be placed at volume V3 (1051*c*) to control resource allocation and usage at virtual volume V3 (1030*c*).

Figure 10B:
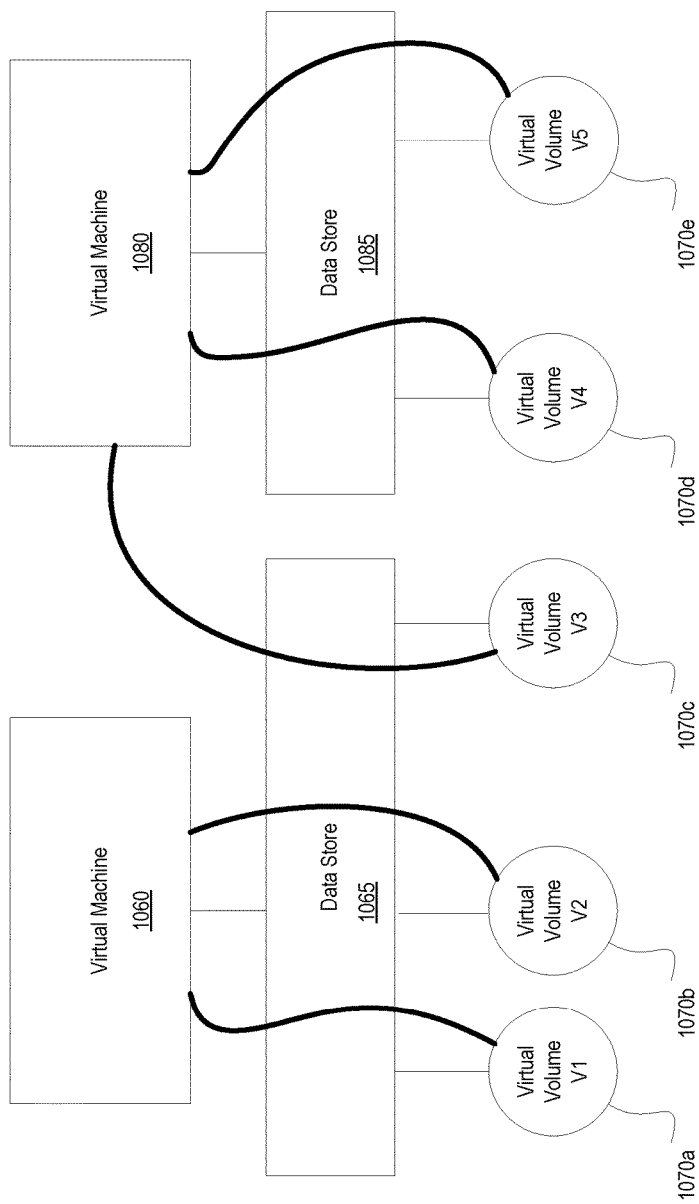
FIG. 10B is an illustration of a cloud-based computer network system having multiple virtual machines (VMs), wherein a VM shares storage resources across multiple data stores, in accordance with one embodiment of the present disclosure.

FIG. 10B is an illustration of a cloud-based computer network system 100B having multiple virtual machines (VMs), wherein a VM shares storage resources across multiple data stores, in accordance with one embodiment of the present disclosure. Independent IOPS and MBPS limits may be placed on the VMs 1060 and 1080 of FIG. 10B, as is described in relation to FIG. 10A (e.g., through mapping). In particular, independent IOPS and MBPS limits may be placed at various schedulers of corresponding scheduler hierarchies to control resource allocation for the VM 1060 and VM 1080. Furthermore, FIG. 10B illustrates how storage resources across multiple data stores may be shared across one or more VMs.

As shown, one or more VMs may be implemented at a back-end server through a network, such as a cloud-based computer system 1000B. System 100B provides computer processing resources (e.g., processing power, storage, etc.) to users over the network. As shown, VM 1060 accesses data store 1065 of the cloud-based system 1000B. Data store 1065 includes one or more virtual volumes. VM 1060 is associated with and can access virtual volume V1 (1070*a*) and volume V2 (1070*b*) through data store 1065. Although data store 1065 contains additional virtual volumes, VM 1060 is not assigned and/or associated with those volumes (e.g., virtual volume V3).

In addition, VM 1080 accesses virtual volumes through two data stores 1065 and 1085. In particular, VM 1080 is associated with and can access virtual volume V3 (1070*c*) through data store 1065. In addition, VM 1080 is associated with and can access virtual volume V4 (1070*d*) through data store 1085, and is associated with and can access virtual volume V5 (1070*e*) through data store 1085.

Accordingly, embodiments of the present disclosure disclosing the fair utilization of system resources of a data storage system through independent setting of IOPS and MBPS limits at each level of a scheduler hierarchy and the management of such when allocating system resources through the scheduler hierarchy, have been described. While specific embodiments have been provided to demonstrate the fair allocation of resources through a scheduler hierarchy based on independent IOPS and MBPS limits set at schedulers in the hierarchy, these are described by way of example and not by way of limitation. Those skilled in the art having read the present disclosure will realize additional embodiments falling within the spirit and scope of the present disclosure.

With the above embodiments in mind, it should be understood that the disclosure can employ various computer-implemented operations involving data stored in computer systems. These operations are those involving physical manipulation of physical quantities. Any of the operations described herein that form part of the disclosure are useful machine operations. The disclosure also relates to a device or an apparatus for performing these operations. The apparatus can be specially constructed for a given purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the disclosed operations.

One or more embodiments can also be fabricated as computer readable code on a non-transitory computer readable storage medium including machine-readable instructions executable by at least one processor, for example to implement a method. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for scheduling operations in a storage system, comprising:
acquiring inputs/outputs per second (IOPS) limits and megabytes per second (MBPS) limits independently at a parent scheduler in a parent level of a scheduler hierarchy of the storage system, wherein the scheduler hierarchy includes the parent level and a child level below the parent level;
acquiring IOPS limits and MBPS limits independently at each child scheduler placed within the child level of the scheduler hierarchy;
receiving a CPU resource allocation at the parent scheduler, wherein the CPU resource allocation is convertible to an IOPS allocation at the parent scheduler;
distributing the IOPS allocation among the child schedulers below the parent scheduler such that each of the child schedulers receive the same distribution of the IOPS allocation; and
allocating IOPS from the IOPS allocation between the child schedulers based on their corresponding IOPS limits.

2. The method of claim 1, wherein allocating IOPS further comprises:
determining a first child scheduler has a first IOPS limit that is below the same distribution of the IOPS allocation;
allocating IOPS to the first child scheduler at the first IOPS limit;
determining a first difference between the same distribution of the IOPS allocation and the first IOPS limit; and
fairly distributing the first difference between first remaining child schedulers below the parent scheduler.

3. The method of claim 2, further comprising:
determining a second child scheduler has a second IOPS limit that is below a modified distribution of the IOPS allocation accounting for the same distribution of the IOPS allocation and the first difference that is fairly distributed;
distributing IOPS to the second child scheduler at the second IOPS limit;
determining a second difference between the modified distribution of the IOPS allocation and the second IOPS limit; and
fairly distributing the second difference between second remaining child schedulers below the parent scheduler to implement work conservation.

4. The method of claim 1, further comprising:
acquiring an IOPS limit at a first child scheduler in a scheduler hierarchy of the storage system, wherein the scheduler hierarchy includes a parent level and a child level, wherein the first child scheduler is placed within the child level;
acquiring an MBPS limit at the first child scheduler, wherein the MBPS limit at the first child scheduler is independent of the IOPS limit at the first child scheduler;
acquiring an IOPS limit at a second child scheduler, wherein the second child scheduler is placed within the child level; and
acquiring an MBPS limit at the second child scheduler, wherein the MBPS limit at the second child scheduler is independent of the IOPS limit at the second child scheduler.

5. The method of claim 1, wherein the parent scheduler is one of a volume, folder, or array, wherein the child scheduler is one of volume and folder, wherein the folder is a collection of at least one of volumes and folders, wherein the array is a collection of at least one of volumes and folders.

6. The method of claim 1, further comprising:
mapping a data store to a folder, wherein a virtual machine includes the data store including a plurality of virtual volumes; and
mapping a first virtual volume to a first volume, wherein the IOPS limit and the MBPS limit for the first volume applies to the first virtual volume.

7. The method of claim 1, further comprising:
moving a child scheduler to another folder;
fairly distributing the IOPS allocation among the remaining child schedulers below the parent scheduler such that each of the child schedulers receive the same distribution of the IOPS allocation; and
allocating IOPS between the remaining child schedulers based on their corresponding IOPS limits.

8. The method of claim 1, wherein the IOPS limits and MBPS limits at the parent scheduler at the parent level are independent of IOPS limits and MBPS limits of schedulers at other levels.

9. The method of claim 1, further comprising:
acquiring the IOPS and MBPS limits at the parent scheduler independently of each other.

10. A non-transitory computer-readable medium comprising machine-readable instructions executable by at least one processor to:

acquire inputs/outputs per second (IOPS) limits and megabytes per second (MBPS) limits independently at a parent scheduler in a parent level of a scheduler hierarchy of the storage system, wherein the scheduler hierarchy includes the parent level and a child level below the parent level;

acquire IOPS limits and MBPS limits independently at each child scheduler placed within the child level of the scheduler hierarchy;

receive a CPU resource allocation at the parent scheduler, wherein the CPU resource allocation is convertible to an IOPS allocation at the parent scheduler;

distribute the IOPS allocation among the child schedulers below the parent scheduler such that each of the child schedulers receive the same distribution of the IOPS allocation; and program instructions for allocating IOPS from the IOPS allocation between the child schedulers based on their corresponding IOPS limits.

11. The computer-readable medium of claim 10, wherein program instructions for allocating IOPS further comprises:
program instructions for determining a first child scheduler has a first IOPS limit that is below the same distribution of the IOPS allocation;
program instructions for allocating IOPS to the first child scheduler at the first IOPS limit;
program instructions for determining a first difference between the same distribution of the IOPS allocation and the first IOPS limit; and
program instructions for fairly distributing the first difference between first remaining child schedulers below the parent scheduler.

12. The computer-readable medium of claim 11, further comprising:
program instructions for determining a second child scheduler has a second IOPS limit that is below a modified distribution of the IOPS allocation accounting for the same distribution of the IOPS allocation and the first difference that is fairly distributed;
program instructions for distributing IOPS to the second child scheduler at the second IOPS limit;
program instructions for determining a second difference between the modified distribution of the IOPS allocation and the second IOPS limit; and
program instructions for fairly distributing the second difference between second remaining child schedulers below the parent scheduler to implement work conservation.

13. The computer-readable medium of claim 10, further comprising:
program instructions for acquiring an IOPS limit at a first child scheduler in a scheduler hierarchy of the storage system, wherein the scheduler hierarchy includes a parent level and a child level, wherein the first child scheduler is placed within the child level;
program instructions for acquiring an MBPS limit at the first child scheduler, wherein the MBPS limit at the first child scheduler is independent of the IOPS limit at the first child scheduler;
program instructions for acquiring an IOPS limit at a second child scheduler, wherein the second child scheduler is placed within the child level; and
program instructions for acquiring an MBPS limit at the second child scheduler, wherein the MBPS limit at the second child scheduler is independent of the IOPS limit at the second child scheduler.

14. The computer-readable medium of claim 10, wherein the parent scheduler is one of a volume, folder, or array, wherein the child scheduler is one of volume and folder, wherein the folder is a collection of at least one of volumes and folders, wherein the array is a collection of at least one of volumes and folders.

15. The computer-readable medium of claim 10, further comprising:
program instructions for moving a child scheduler to another folder;
program instructions for fairly distributing the IOPS allocation among the remaining child schedulers below the parent scheduler such that each of the child schedulers receive the same distribution of the IOPS allocation; and
program instructions for allocating IOPS between the remaining child schedulers based on their corresponding IOPS limits.

16. A computer system comprising:
a processor; and
memory coupled to the processor and having stored therein machine-readable instructions that, when executed by the computer system, cause the computer system to:
acquire inputs/outputs per second (IOPS) limits and megabytes per second MBPS) limits independently at a parent scheduler in a parent level of a scheduler hierarchy of the storage system, wherein the scheduler hierarchy includes the parent level and a child level below the parent level;
acquire IOPS limits and MBPS limits independently at each child scheduler placed within the child level of the scheduler hierarchy;
receive a CPU resource allocation at the parent scheduler, wherein the CPU resource allocation is convertible to an IOPS allocation at the parent scheduler;
distribute the IOPS allocation among the child schedulers below the parent scheduler such that each of the child schedulers receive the same distribution of the IOPS allocation; and
allocate IOPS from the IOPS allocation between the child schedulers based on their corresponding IOPS limits.

17. The computer system of claim 16, wherein the allocating IOPS in the method further comprises:
determining a first child scheduler has a first IOPS limit that is below the same distribution of the IOPS allocation;
allocating IOPS to the first child scheduler at the first IOPS limit;
determining a first difference between the same distribution of the IOPS allocation and the first IOPS limit; and
fairly distributing the first difference between first remaining child schedulers below the parent scheduler.

18. The computer system of claim 17, wherein the method further comprises:
determining a second child scheduler has a second IOPS limit that is below a modified distribution of the IOPS allocation accounting for the same distribution of the IOPS allocation and the first difference that is fairly distributed;
distributing IOPS to the second child scheduler at the second IOPS limit;
determining a second difference between the modified distribution of the IOPS allocation and the second IOPS limit; and fairly distributing the second difference between second remaining child schedulers below the parent scheduler to implement work conservation.

19. The computer system of claim 16, wherein the method further comprises:
   acquiring an IOPS limit at a first child scheduler in a scheduler hierarchy of the storage system, wherein the scheduler hierarchy includes a parent level and a child level, wherein the first child scheduler is placed within the child level;
   acquiring an MBPS limit at the first child scheduler, wherein the MBPS limit at the first child scheduler is independent of the IOPS limit at the first child scheduler;
   acquiring an IOPS limit at a second child scheduler, wherein the second child scheduler is placed within the child level; and
   acquiring an MBPS limit at the second child scheduler, wherein the MBPS limit at the second child scheduler is independent of the IOPS limit at the second child scheduler.

20. The computer system of claim 16, wherein the method further comprises:
   moving a child scheduler to another folder;
   fairly distributing the IOPS allocation among the remaining child schedulers below the parent scheduler such that each of the child schedulers receive the same distribution of the IOPS allocation; and
   allocating IOPS between the remaining child schedulers based on their corresponding IOPS limits.

* * * * *